United States Patent [19]
Endo et al.

[11] Patent Number: 5,676,560
[45] Date of Patent: Oct. 14, 1997

[54] POWDER FEED CONNECTOR

[75] Inventors: Takayoshi Endo; Toshiaki Hasegawa; Hirotaka Fukushima; Nobuaki Yoshioka; Shigeo Mori, all of Shizuoka, Japan

[73] Assignee: Yazaki Corporation, Tokyo, Japan

[21] Appl. No.: 566,089

[22] Filed: Dec. 1, 1995

[30] Foreign Application Priority Data

Dec. 1, 1994 [JP] Japan ..................... 6-298455
Dec. 20, 1994 [JP] Japan ..................... 6-316914

[51] Int. Cl.⁶ ............................... H01R 13/62
[52] U.S. Cl. ................................... 439/310
[58] Field of Search ................. 439/32, 48, 342, 439/135, 136, 142, 310, 352, 353, 357, 358, 372, 152

[56] References Cited

U.S. PATENT DOCUMENTS

| 4,898,541 | 2/1990 | Lhuillier ................... 439/342 |
| 5,350,312 | 9/1994 | Kuno et al. ................. 439/310 |
| 5,417,579 | 5/1995 | Yoshioka et al. ............. 439/310 |

FOREIGN PATENT DOCUMENTS 6-188044  7/1994  Japan ..................... H01R 13/639

*Primary Examiner*—P. Austin Bradley
*Assistant Examiner*—Yong Kim
*Attorney, Agent, or Firm*—Sughrue, Mion, Zinn, Macpeak & Seas

[57] ABSTRACT

A power feed connector device includes an electromagnetic moving device for moving at least one of a pair of female and male connectors forward and backward along a fitting axis so as to fit the two connectors together and to disengage the two connectors from each other.

10 Claims, 26 Drawing Sheets

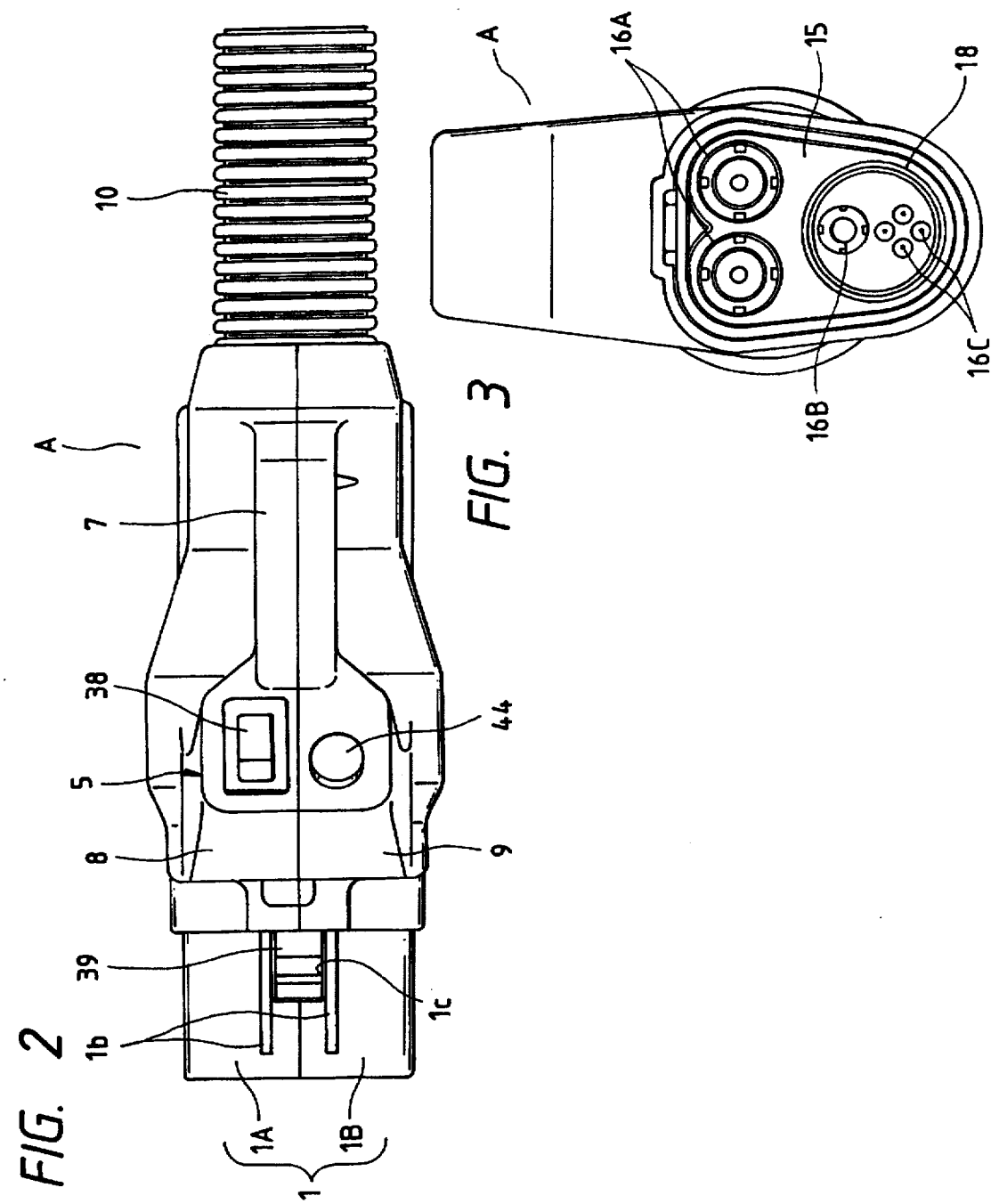

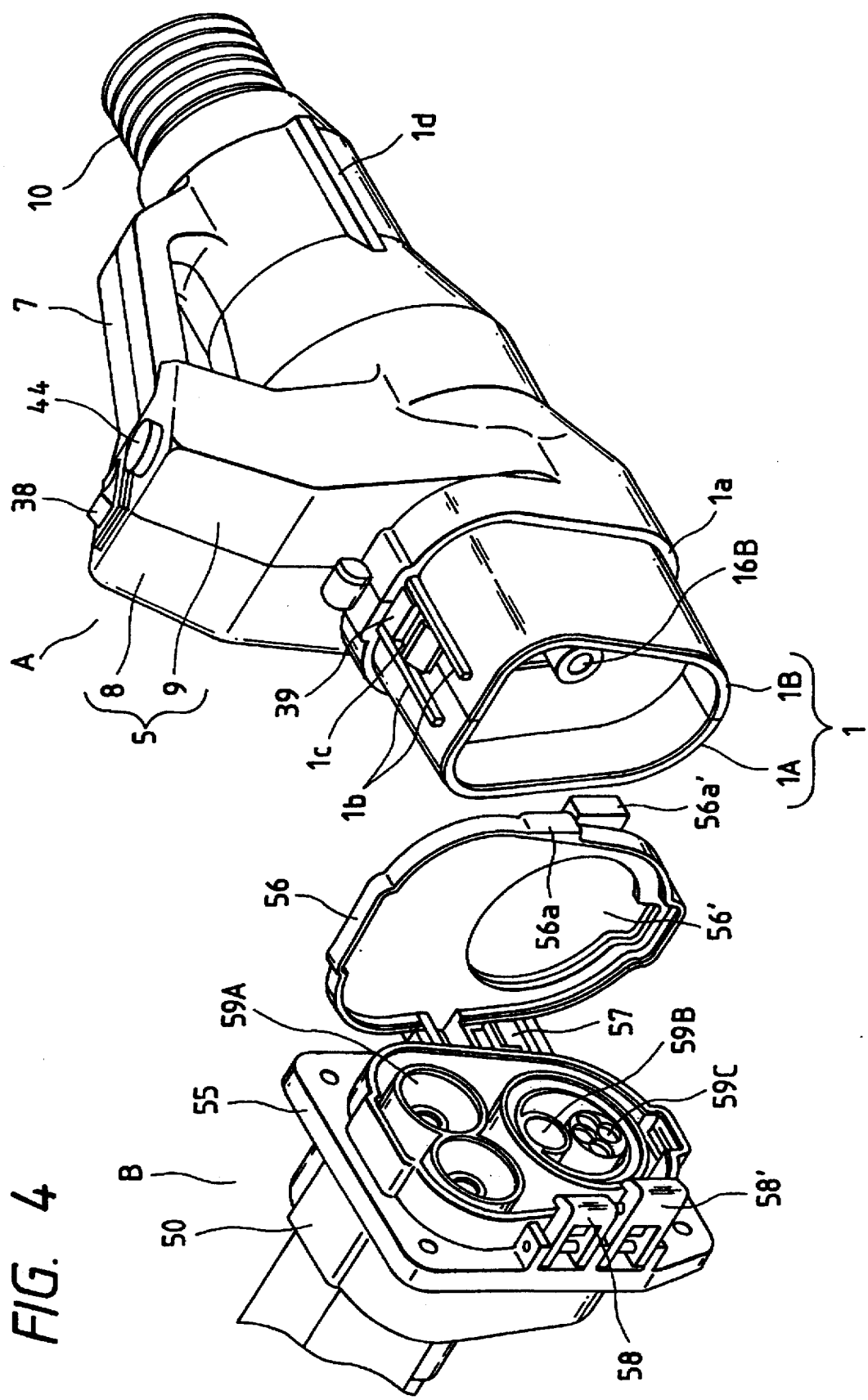

POWDER FEED CONNECTOR

BACKGROUND OF THE INVENTION

1. Field of the Invention

This invention relates to a power feed connector used, for example, for charging an electric car, which power feed connector can be quite easily attached to and detached from a power-receiving connector by electrically-operated means.

2. Related Art

One conventional power feed connector of the type described is disclosed in Japanese Patent Unexamined Publication No. 6-188044, and is shown in FIG. 13.

In this power feed connector a, as means for moving a connector body c (which receives a plurality of terminals b therein) forward and backward relative to a connector casing c, there are used leverage and a spring e. More specifically, there is provided a mechanism by which when a lever f is grasped, the connector body c is pushed through a handle g, with pins $P_1$ and $P_2$ serving as a fulcrum and an operating point, respectively, and with this construction the power feed connector can be fitted relative to a power-receiving connector with a low insertion force. The rate of reduction of the insertion force at this time is expressed by $(L_1/L_2) \times 100(\%)$ where $L_1$ represents the distance between the fulcrum $P_1$ and the operating point $P_2$, and $L_2$ represents the distance between the fulcrum $P_1$ and a force-applying point $P_3$ of the lever f.

In the above power feed connector a, since the lever f is grasped by one or two hands, it is impossible to obtain a large lever stroke. More specifically, since the distance $L_2$ is actually not so large, it is impossible to obtain a large stroke of the connector body c. Therefore, the size of the connector body and the low insertion-force design are limited, and there has been encountered a problem that this construction can not be put into practical use as a large-size connector for supplying a large electric current.

Further, in the above construction in which the connectors are manually fitted together and disengaged from each other, the insertion/withdrawal force is limited, and there has been encountered a problem that large-size connectors for supplying large current could not be easily fitted together and disengaged from each other. Namely, in the manual operation, the insertion force for the fitting operation and the withdrawal force for the disengaging operation were insufficient. This has raised a problem that the manually-operated construction can not be applied to a connector for supplying large current and a high-density multi-pole connector which need large insertion and withdrawal forces.

SUMMARY OF THE INVENTION

The present invention has been made in view of the above problems, and an object of the invention is to provide a power feed connector suited for supplying a large electric current, in which a connector body can be quite easily moved forward and backward by operating a switch button.

Another object of the invention is to provide a power feed connector-connecting method of automatically fitting and disengaging a connector, and another object is to provide a power feed connector device for achieving such a connecting method.

To achieve the above object, the present invention provides a power feed connector characterized by the provision of a tubular casing; a connector body slidably mounted on the casing, the connector body having a plurality of terminals received therein; and a motor mounted within the casing, the motor being connected to a rear half portion of the connector body through a speed reduction mechanism so as to move the connector body forward and backward.

Preferably, the casing includes a lock arm for engagement with the power-receiving connector upon fitting of the power feed connector relative to the power-receiving connector, and a lock release pin for releasing the locking of the lock arm. Preferably, the connector body has a lock release prevention piece portion for preventing the locking of the lock arm from being released when the power feed connector and the power-receiving connector are completed fitted together.

The present invention provides a power feed connector characterized by the provision of a tubular casing having a connector receiving chamber at its front half portion and a feed gear receiving chamber at its rear half portion, the casing also having an operation chamber at its one side portion; a connector body slidably mounted within the connector receiving chamber of the casing, the connector body having a plurality of terminals received therein; a motor fixedly mounted within the operation chamber; a feed gear mounted within the feed gear receiving chamber, the feed gear being connected to the motor through a speed reduction mechanism, and the feed gear having internal threads formed on an inner peripheral surface thereof; and a cylindrical threaded member connected to a rear portion of the connector body, the cylindrical threaded member being threadedly engaged with the feed gear so as to move the connector body forward and backward when the motor is rotated in normal and reverse directions.

Wires, connected respectively to the plurality of terminals within the connector body, are passed through a bore of the cylindrical threaded member to the exterior of the power feed connector. The cylindrical threaded member is fitted on a metal shell, fixed to a rear end portion of the connector body, against rotation relative to the metal shell, and wires, connected respectively to the plurality of terminals, are gathered into a bundle by the metal shell.

To achieve the above objects, the present invention provides a method of connecting a power feed connector, wherein at least one of a pair of male and female connectors is moved forward and backward along a fitting axis by electromagnetic moving means, thereby fitting the two connectors together and disengaging the two connectors from each other.

A power feed connector device of the present invention is provided by the provision of electromagnetic moving means for moving at least one of a pair of male and female connectors forward and backward along a fitting axis so as to fit the two connectors together and to disengage the two connectors from each other.

The electromagnetic moving means can comprise an electric motor.

The electromagnetic moving means can comprise a solenoid.

A method of connecting a power feed connector according to the present invention is characterized in that a plurality of pairs of male and female connectors are sequentially fitted together and disconnected one pair after another with a time difference.

A power feed connector device of the present invention is characterized by the provision of electromagnetic moving means by which a plurality of pairs of male and female connectors are sequentially fitted together and disconnected one pair after another with a time difference.

In the present invention, the connector body is moved forward and backward in accordance with the normal and reverse rotations of the motor, and therefore it is only necessary to insert the power feed connector into the power-receiving connector, and then the two connectors can be easily connected together and disconnected from each other by operating a motor switch. Therefore, even a large-size connector, which requires a large insertion force through a manual operation, can be handled with a small force, and such a large-size connector can be developed and put into practical use.

In the present invention, the casing is provided with the lock arm for engagement with the power-receiving connector upon fitting of the power feed connector relative to the power-receiving connector, and the lock release pin for releasing the locking of the lock arm. Therefore, the power feed connector will not be accidentally disengaged from the power-receiving connector, thus ensuring the safe operation. In the present invention, the connector body has the lock release prevention piece portion for preventing the locking of the lock arm from being released when the power feed connector and the power-receiving connector are completed fitted together. Therefore, even if the lock release pin is accidentally pushed during the charging operation, the locking will not be released, thus providing a high safety.

In the present invention, the overall length of the power feed connector is not increased because of the provision of the speed reduction mechanism and a bolt-nut mechanism (constituted by the cylindrical threaded member and the feed gear), thus enabling the compact design.

In the present invention, the wires, connected respectively to the plurality of terminals, are passed through the bore of the cylindrical threaded member to the exterior. Therefore, the wires will not be entangled with the drive mechanisms including the motor, and this prevents damage to the wires, and also ensures the smooth forward and backward movement of the connector body.

In the present invention, the cylindrical threaded member is fitted on the metal shell, fixed to the rear end portion of the connector body, against rotation relative to the metal shell, and the wires, connected respectively to the plurality of terminals, are gathered into a bundle by the metal shell. Therefore, the wires always move back and forth together with the connector body, so that the terminals are positively prevented from being withdrawn from the connector body.

In the power feed connector-connecting method of the invention, at least one of the pair of male and female connectors is moved forward and backward along the fitting axis by the electromagnetic moving means, thereby fitting the two connectors together and disengaging the two connectors from each other. With this construction, a power feed portion and a power-receiving portion are automatically connected together and disconnected from each other.

In the power feed connector device of the present invention, the electromagnetic moving means, which is contained in the device, and comprises an electric motor or a solenoid, moves at least one of the pair of male and female connectors forward and backward along a fitting axis so as to fit the two connectors together and to disengage the two connectors from each other. Therefore, there can be achieved the power feed connector device in which the power feed portion and the power-receiving portion can be automatically connected together and disconnected from each other.

In the power feed connector-connecting method of the invention, the plurality of pairs of male and female connectors are sequentially fitted together and disconnected one pair after another with a time difference. Therefore, each pair of connectors can be connected together and disconnected from each other with a low insertion/withdrawal force. If the order of connection and disconnection of the pairs of the connectors is so determined that the grounding connectors are first connected together and disconnected from each other last, the safety is secured.

In the power feed connector device of the present invention, by the electromagnetic moving means contained in the device, the plurality of pairs of male and female connectors are sequentially fitted together and disconnected one pair after another with a time difference. Therefore, there can be achieved the power feed connector device in which the power feed portions and the power-receiving portions can be automatically connected together and disconnected from each other in a desired order.

BRIEF DESCRIPTION OF THE DRAWINGS

FIG. 2 is a plan view of the connector of FIG. 1;

FIG. 3 is a left side-elevational view of the connector of FIG. 1;

FIG. 4 is a perspective view showing the power feed connector separated of FIG. 1 from a power-receiving connector;

DETAILED DESCRIPTION OF THE PREFERRED EMBODIMENTS

Figure 1:
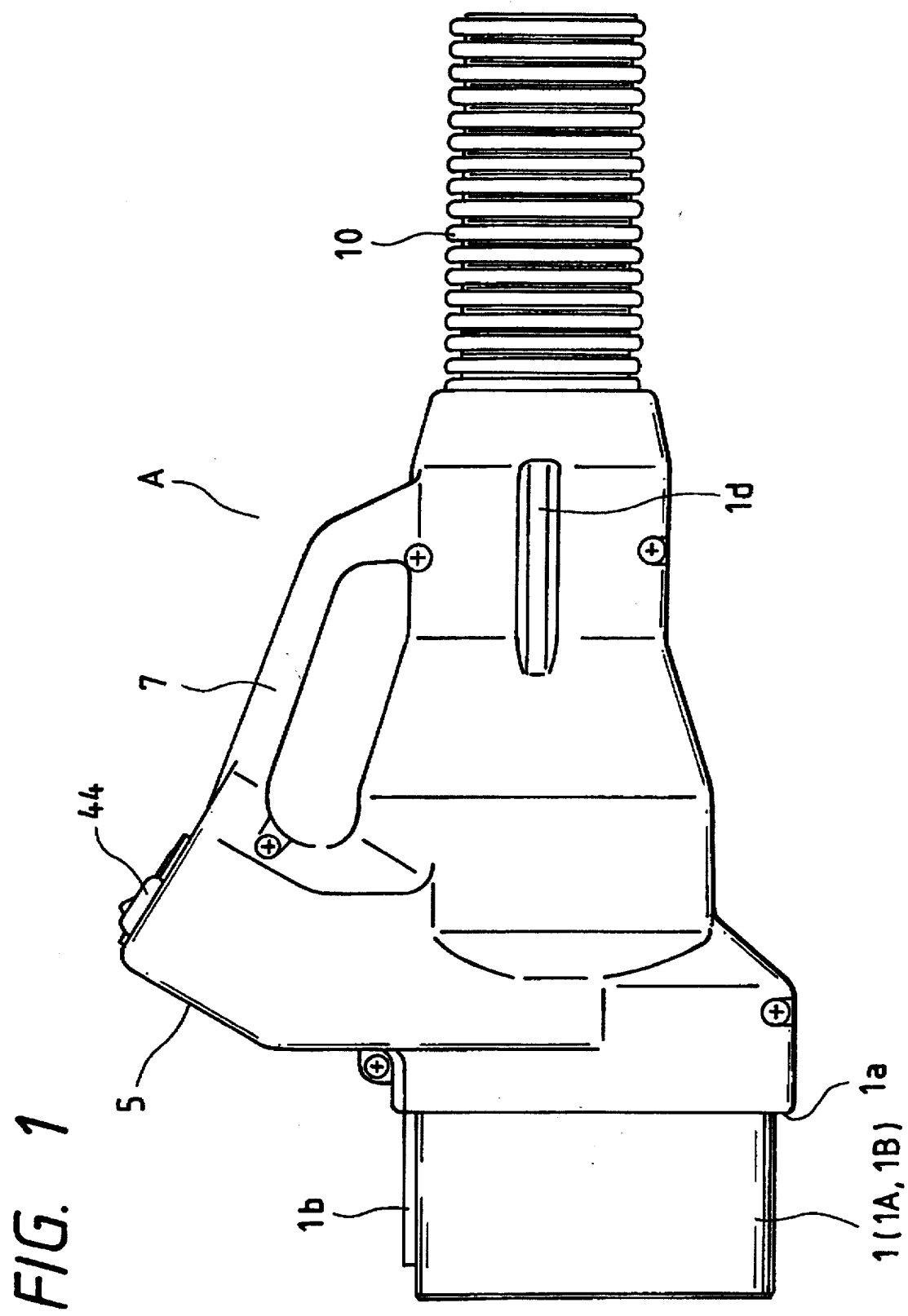
FIG. 1 is a front-elevational view of one preferred embodiment of a power feed connector of the present invention.

Preferred embodiments of the present invention will now be described with reference to the accompanying drawings.

First Embodiment

As shown in FIG. 4, a charging connector comprises the power feed connector A connected to a power supply device (not shown), and the power-receiving connector B fixedly mounted, for example, on a body of an automobile.

The power feed connector A includes a split casing 1 composed of a pair of opposed half casings 1A and 1B mated together. A connector body 11 is slidably received in a front haft portion of the casing 1, and drive members (including a feed gear 28 and a cylindrical threaded member 26) for moving the connector body 11 forward and backward are mounted within a rear half portion of the casing 1. A motor (drive source) 31 is mounted within an upper portion of the casing 1. A corrugated tube 10, receiving a cable extending from the power supply device (not shown), is connected to a rear end of the casing 1.

The casing 1 has a connector receiving chamber 2 at its front half portion, a feed gear receiving chamber 3 at its rear half portion, and a corrugated tube-connecting portion 4 at its rear end. An operation chamber 5 is formed in a bulged manner above the feed gear receiving chamber 3 in continuous relation thereto. A handgrip 7 is formed through a slot 6, and extends from the operation chamber 5 and the rear end of the casing 1. The operation chamber 5 is divided into a motor receiving chamber 8, formed by the half casing 1A, and a lock chamber 9 formed by the half casing 1B. The corrugated tube 10 is fixedly fitted in the corrugated tube-connecting portion 4 by grooves 4a formed in an inner peripheral surface of this connecting portion 4.

A stepped portion 1a is formed on outer peripheral surfaces of those portions of the half casings 1A and 1B of the casing 1 which jointly form the connector receiving chamber 2. A notch portion 1c having a rib 1b is formed in each of upper portions of the two half casings 1A and 1B butted against each other, and the two notch portions 1c jointly form a lock window for a lock arm 39 described later. A pair of groove portions 1d are formed respectively at rear portions of peripheral walls of those portions of the half casings 1A and 1B which jointly form the feed gear receiving chamber 3, and fixing piece portions 23f of metal shells 23 and 23' (described later) are slidably received in the groove portions 1d.

A stepped portion 2a is formed on an inner peripheral surface of the connector receiving chamber 2 at its front portion, and the connector body 11 is slidably fitted in a depressed portion extending rearwardly from this stepped portion 2a.

The connector body 11 comprises a housing 15 having three kinds of (that is, large-, medium- and small-size) female terminals 12, 13 and 14 received therein. The large female terminals 12 are used for power lines for charging purposes, and the medium female terminal 13 is used for a grounding line, and the small female terminals 14 are used for signal lines. The large female terminals 12, as well as the medium female terminal 13, are formed by cutting a round bar of copper, and ordinary connector terminals are used as the small female terminals 14.

Figure 8:
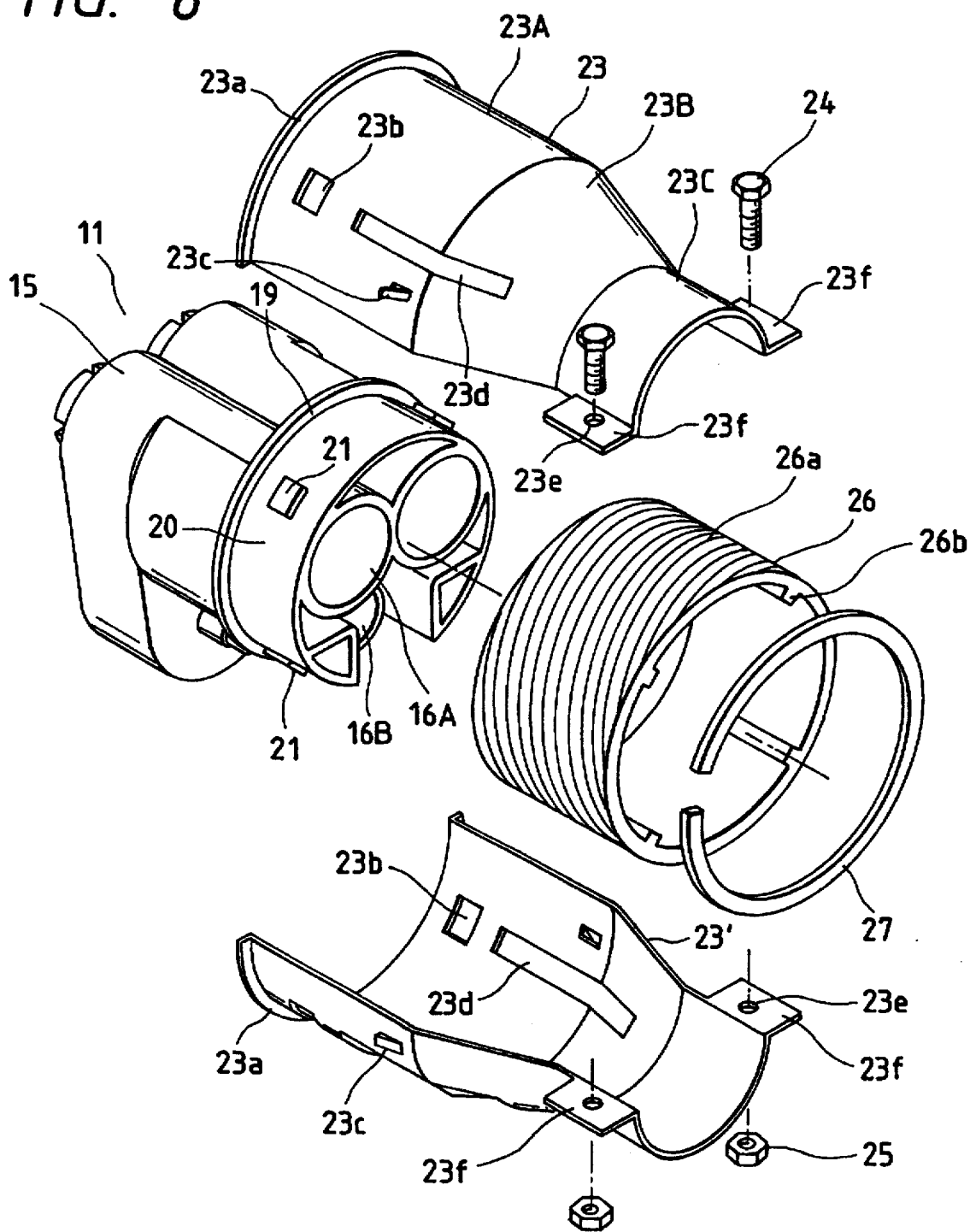
FIG. 8 is an exploded, perspective view showing a connector body 11, metal shells 23 and 23' and a drum 26.

The housing 15 has two terminal receiving chambers 16A (corresponding to the large female terminals 12) at its upper portion, a terminal receiving chamber 16B (corresponding to the medium female terminal 13) at its central portion, and four terminal receiving chambers 16C (corresponding to the small female terminals 14) at its lower portion. At a front half portion of the housing 15, a waterproof packing 17 is fitted on a proximal end portion of a peripheral wall of each terminal receiving chamber 16A for the female terminal 12, and the terminal receiving chamber 16B and the terminal receiving chambers 16C are disposed within a single hood 18 in a generally concentrated manner, and a waterproof packing 17' is fitted on an outer periphery of the hood 18. At a rear half portion of the housing 15, the two terminal receiving chambers 16A and the terminal receiving chamber 16B are disposed within a single connection ring 20 with a peripheral flange 19 in a generally concentrated manner as shown in FIG. 8, and a plurality of retaining projections 21 are formed on an outer peripheral surface of the connection ring 20. A lock release prevention piece portion 15a is formed at the outer peripheral wall of the housing 15 intermediate the opposite ends thereof, and serves to prevent the disengagement of the power feed connector A during the charging operation as described later.

The rear end of the connector body 11 is connected to the motor 31, fixedly mounted within the motor receiving chamber 8, through a bolt-nut mechanism 22 and a speed reduction mechanism 33.

The bolt-nut mechanism 22 comprises the two metal shells 23 and 23' (joined together to provide a split metal shell) connected to the connection ring 20 of the housing 15, the cylindrical threaded member 26 (hereinafter referred to as "drum") fitted on the jointed metal shells, and the feed gear 28.

The metal shell 23 (23') includes a larger-diameter portion 23A for fitting on the outer peripheral surface of the connection ring 20, a smaller-diameter portion 23C, and a slanting portion 23B interconnecting the portions 23A and 23C. A flange 23a is formed on a distal end of the larger-diameter portion 23A, and retaining holes 23b are formed through a front portion of the larger-diameter portion 23A, and retaining lances 23c are formed by stamping at a rear portion of the larger-diameter portion 23A. Retaining slots 23d are formed through the larger-diameter portion 23A and the slanting portion 23B, and extend parallel to the axis of the split metal shell. The pair of fixing piece portions 23f each having a bolt hole 23e are formed at opposite lateral sides of the smaller-diameter portion 23C, respectively.

The pair of upper and lower metal shells 23 and 23' are attached to the connection ring 20 in an embracing manner, and are positioned with respect to the connection ring 20 by the retaining projections 21 and the retaining holes 23b, and each pair of upper and lower fixing piece portions 23f and 23f mated with each other are fastened together by a bolt 24. By doing so, the metal shells 23 and 23' are fixedly secured to the connector body 11 against movement, and also wires 47 connected to the female terminals 12 to 14 are joined together into a bundle, and are fixed to the metal shells 23 and 23'. Therefore, since the wires 47 move together with the metal shells 23 and 23' and hence with the connector body 11, the female terminals 12 to 14 will not be withdrawn from the respective terminal receiving chambers 16A to 16C, and the wires will not be entangled, thus preventing damage thereto.

The drum 26, having external threads 26a on its outer peripheral surface and a plurality of ribs 26b on its inner peripheral surface, is fitted on the joined metal shells 23 and 23' from the rear side (that is, the smaller-diameter portions 23C), and the ribs 26b are engaged in the retaining slots 23d, respectively. A C-ring 27 is fitted on the joined metal shells 23 and 23', and is held between the retaining lances 23c and the rear end of the drum 26, thereby fixing the drum 26. Namely, the drum 26 is held against rotation relative to the metal shells 23 and 23' because of the engagement of the ribs 26 in the respective retaining slots 23d, and is held between the front-side flange 23a and the rear-side C-ring 27 against forward and backward movement. The feed gear 28 is threaded on the outer periphery of the drum 26, the feed gear 28 having internal threads 28a, formed on its inner peripheral surface, and a spur gear portion 28b formed on its outer peripheral surface.

The above parts of the bolt-nut mechanism 22 are received within the feed gear receiving chamber 3 of the casing 1. More specifically, a pair of front and rear peripheral drum supports 29 and 29 are formed on an inner peripheral surface of the feed gear receiving chamber 3, the connector body 11 and the drum 26 are supported respectively by the aforesaid depressed portion of the connector receiving chamber 2 and the drum supports 29 and 29 for sliding movement in unison with each other. A gear cover 30 is fitted on the feed gear 28, and is disposed between the two drum supports 29 and 29, the gear cover 30 having a window or opening in its top portion. The spur gear portion 28b of the feed gear 28 is connected to the speed reduction mechanism 33 through this window 30a.

The speed reduction mechanism 33 is mounted within the motor receiving chamber 8, and comprises a first gear 34 fixedly mounted on a motor shaft 31a of the motor 31 fixedly mounted on a mounting member 32, a second gear 35 in mesh with the first gear 34, a third gear 36 in mesh with a smaller gear 35a of the second gear 35, and a fourth gear 37 in mesh with a smaller gear 36a of the third gear 36. The fourth gear 37 is in mesh with the spur gear portion 28a of the feed gear 28 through the window 30a in the gear cover 30.

A change-over switch 38 for driving the motor is mounted on the top of the motor receiving chamber 8. A mounting frame 40 extends upwardly from the proximal end of the lock arm 39, and is pivotally mounted by a pin 41 within a lower half portion of the lock chamber 9 disposed in opposed relation to the motor receiving chamber 8. A lock release pin 43 is received in an upper half portion of the lock chamber 9, and is supported by pair of flanges 45 and 45 for upward and downward movement, the lock release pin 43 being urged upwardly by a return spring 42. A head 44 of the lock release pin 43 is exposed to the top of the lock chamber 9. The pin 41 is formed integrally with a mounting plate (not shown) mounted on the half casing 1B. The lock arm 39 has a slanting surface 39a and a retaining recess 39b for the power-receiving connector B. The lock arm 39 is exposed through the lock window in the casing 1, and is normally urged upwardly by a spring (not shown) provided between the pin 41 and the mounting frame 40.

Figure 5:
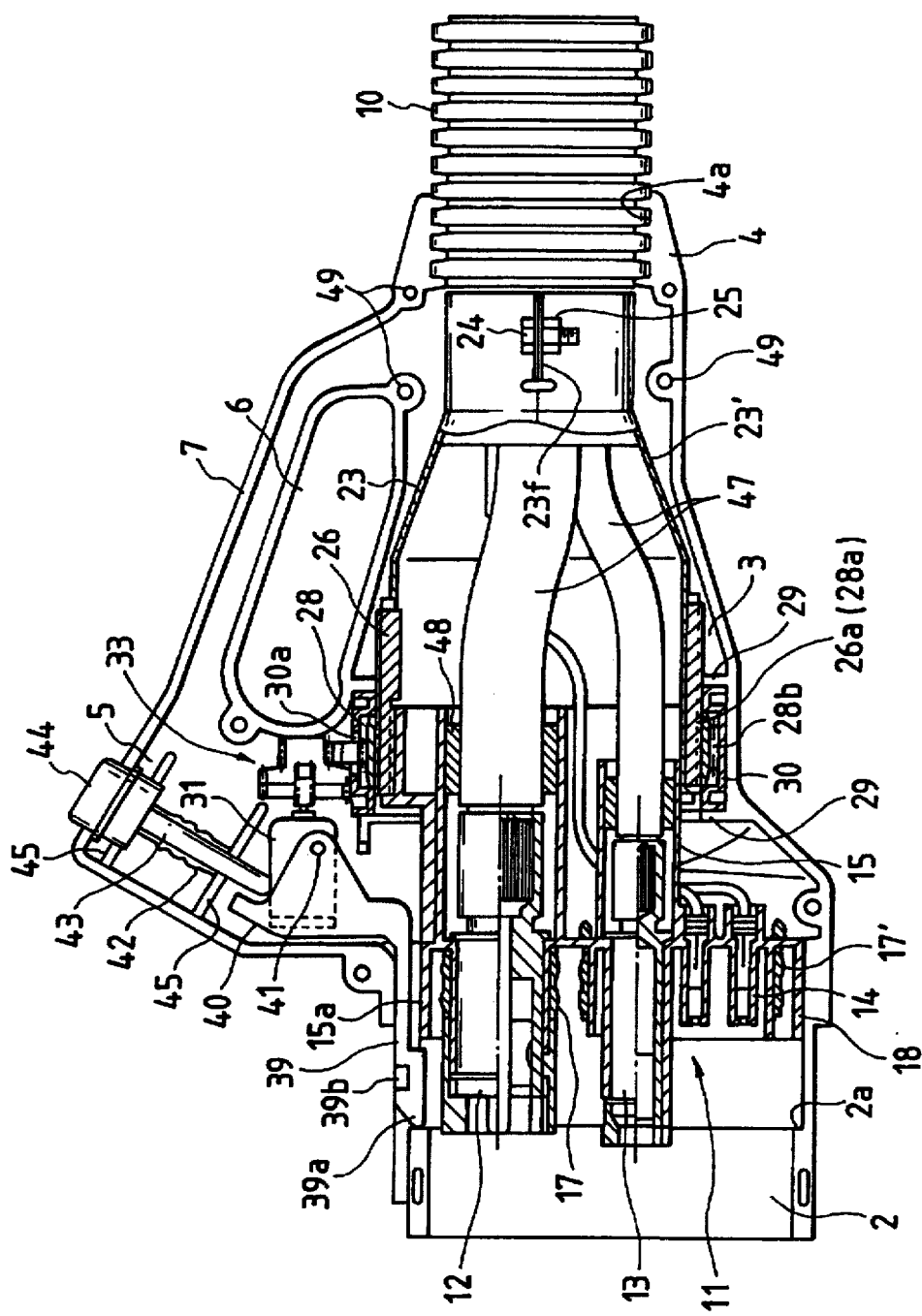
FIG. 5 is a vertical cross-sectional view of the connector of FIG. 1.
Figure 6:
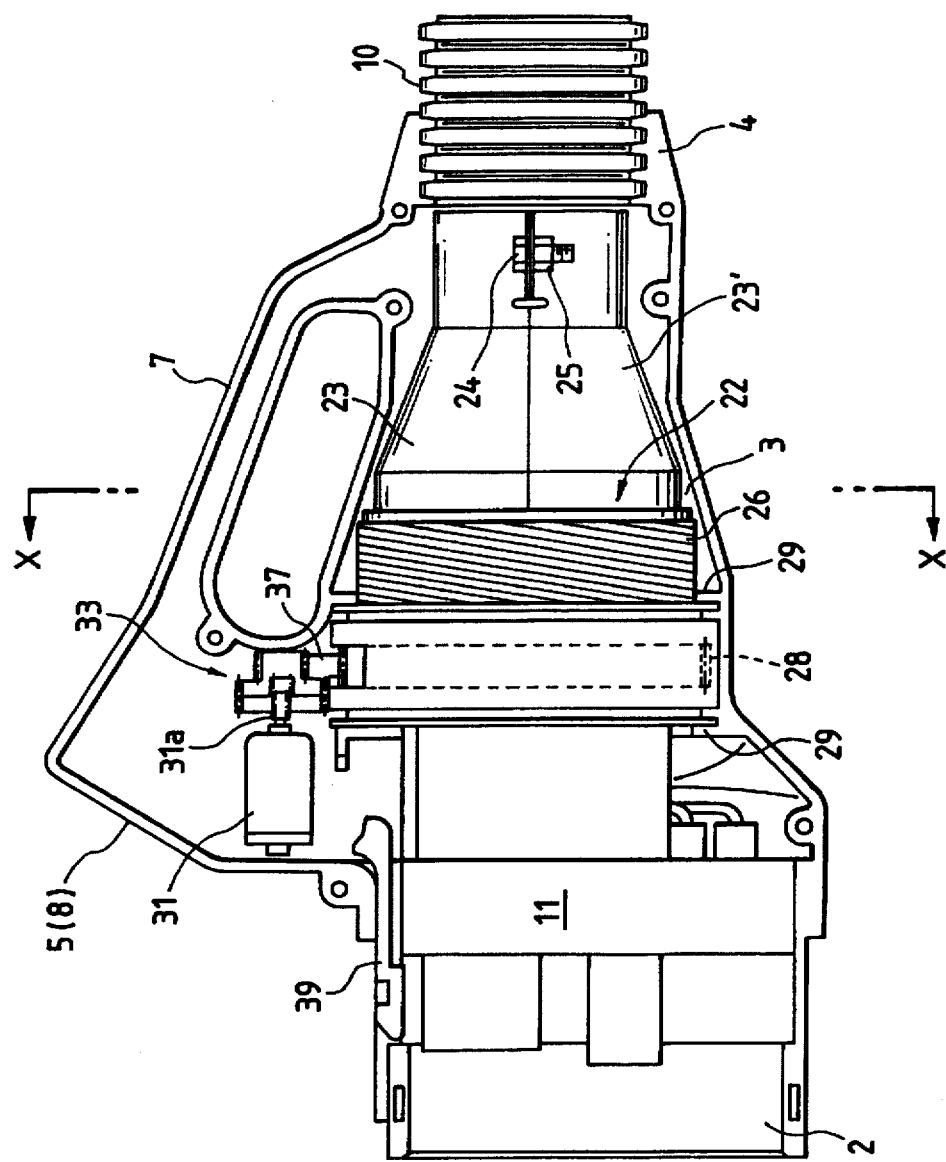
FIG. 6 is a partly vertical cross-sectional view showing a bolt-nut mechanism and a speed reduction mechanism in the connector of FIG. 1.
Figure 7:
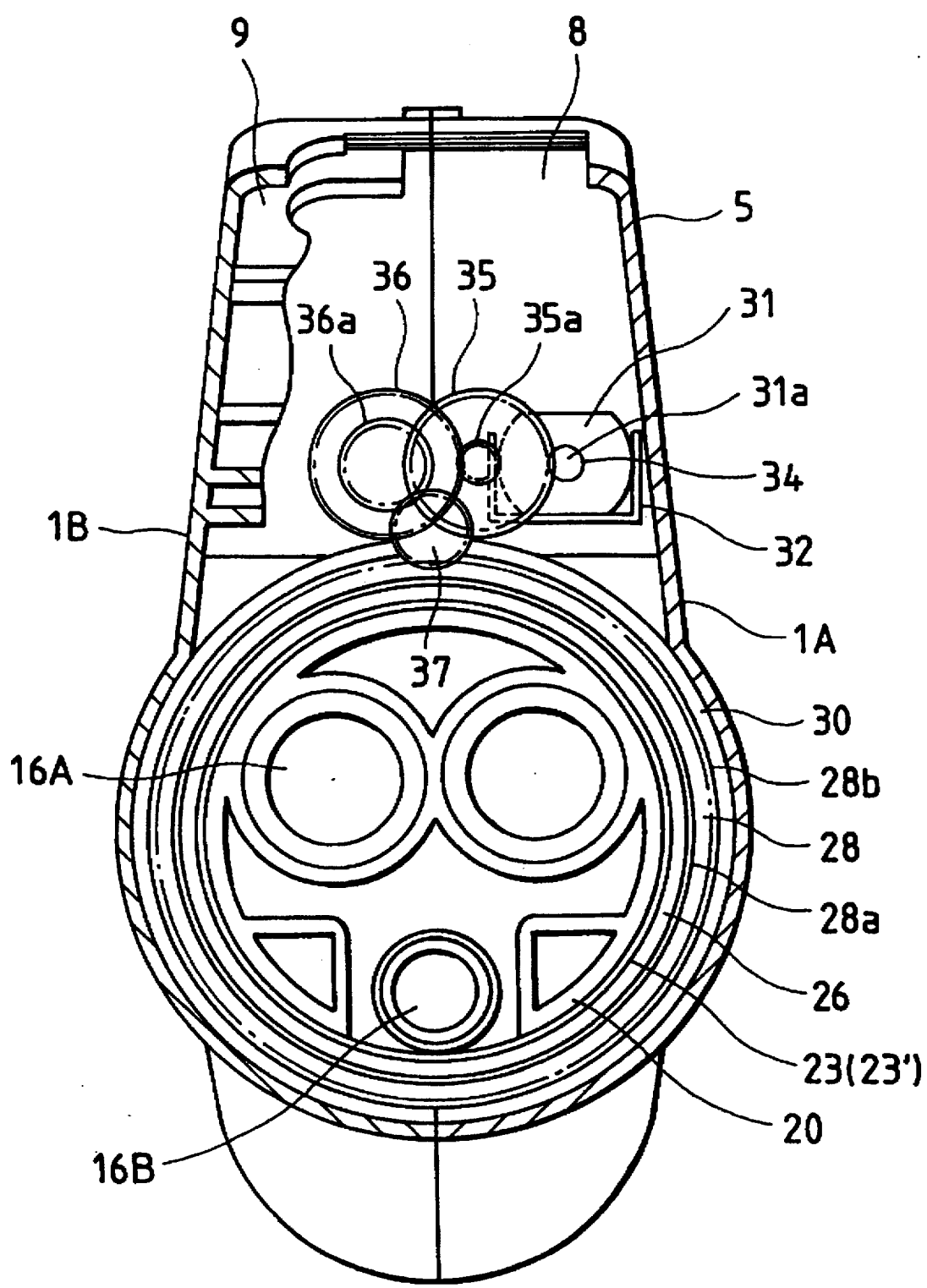
FIG. 7 is a cross-sectional view taken along the line X—X of FIG. 6.

In FIG. 5, reference numeral 47 denotes the wires connected to the ends of the female terminals 12 to 14, reference numeral 48 a waterproof plug, and reference numeral 49 screw insertion holes (or screws) for fastening the half casings 1A and 1B together.

Figure 9:
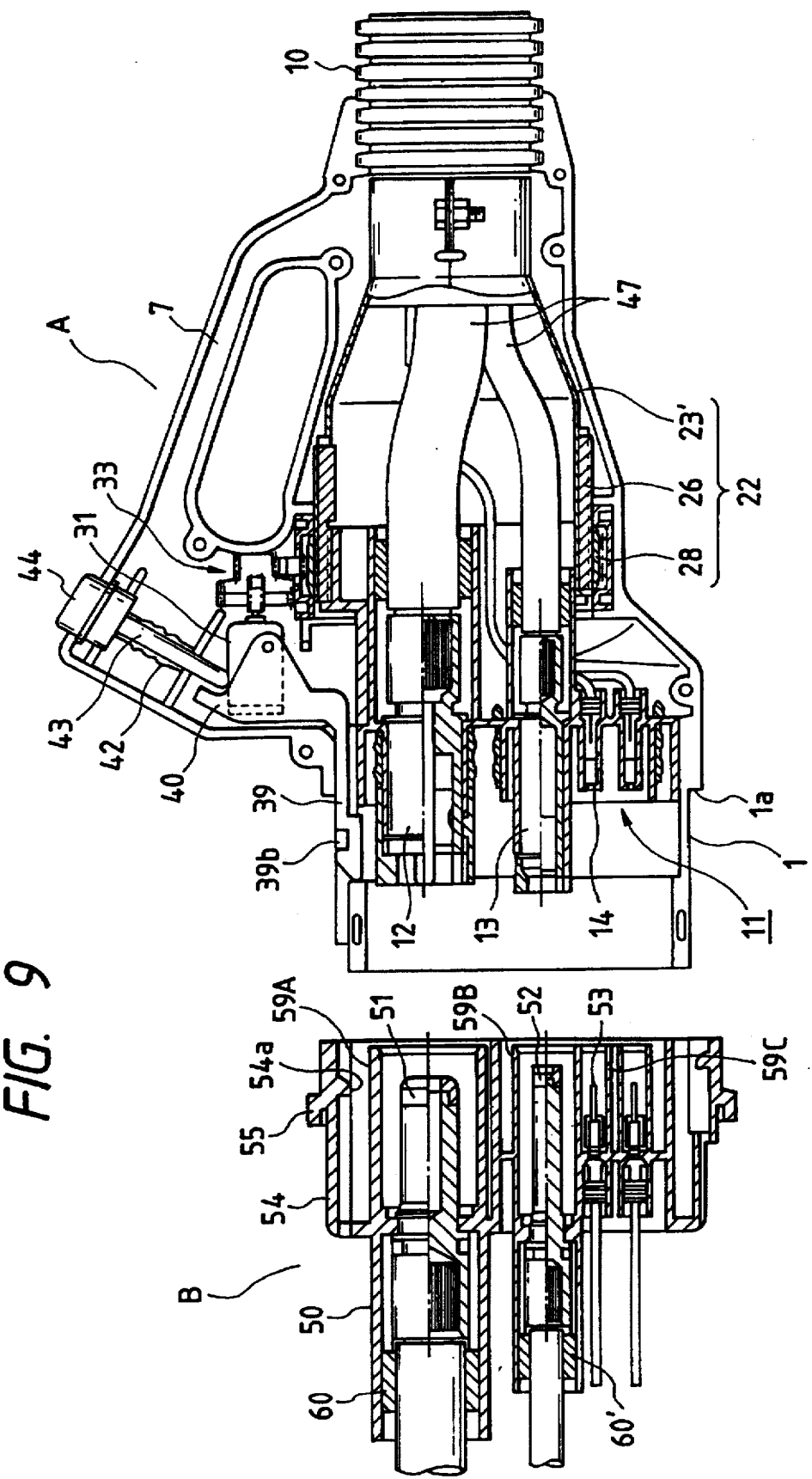
FIG. 9 is a vertical cross-sectional view showing a condition before the power feed connector and the power-receiving connector are fitted together.

As shown in FIGS. 4 and 9, the power-receiving connector B includes a connector body 50 receiving large, medium and small male terminals 51, 52 and 53 therein, and a shell 54 at a front end portion of the connector body 50, the shell 54 being adapted to receive the front end portion of the casing of the power feed connector A therein. The shell 54 is adapted to be fixedly secured by bolts to a vehicle body (not shown) through a flange 55 formed on an outer peripheral surface of the shell 54. A retaining projection 54a for engagement in the retaining recess 39b of the lock arm 39 is formed on an inner surface. Caps 56 and 56' are openably mounted at their one ends on an open end portion of the shell 54 by respective hinges 57, and retaining portions 56a and 56a' are formed respectively at the other ends of the caps 56 and 56' in a stepped manner. The retaining portions 56a and 56a' are lockingly engageable respectively with pivotal lock members 58 and 58' provided on the flange 55.

Reference numerals 59A, 59B and 59C denote terminal receiving chambers which receives the large, medium and small male terminals 51, 52 and 53, respectively, and reference numeral 60 and 60' denote waterproof plugs.

Next, the fitting of the power feed connector A relative to the power-receiving connector B, the charging operation, and the disengaging operation will be described below.

The caps 56 and 56' of the power-receiving connector B are opened, and the power feed connector A is opposed to the shell 54 as shown in FIG. 9.

Figure 10:
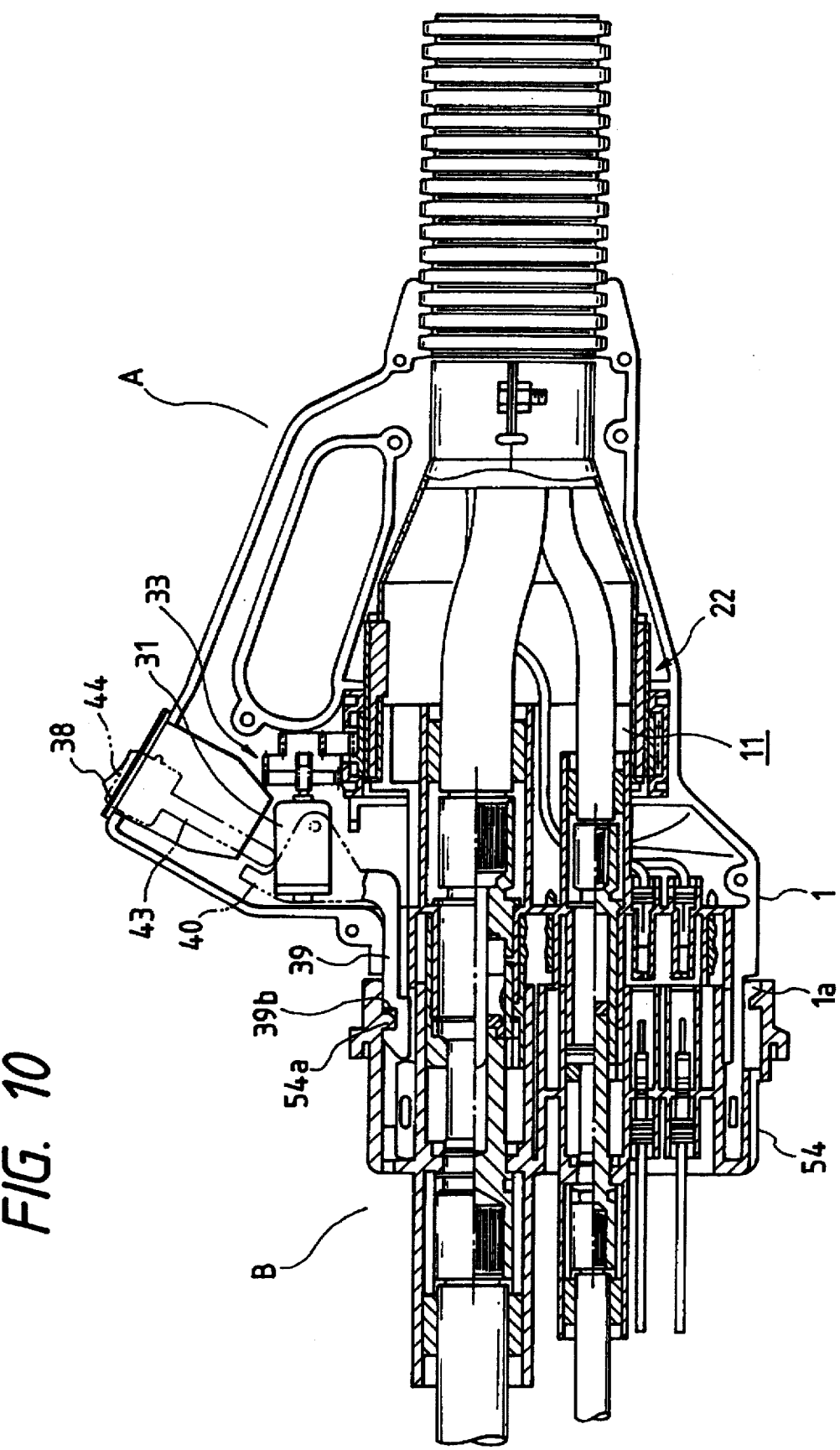
FIG. 10 is a vertical cross-sectional view showing a condition in which the power feed connector and the power-receiving connector are provisionally retained relative to each other.

Then, the front end portion of the casing 1 of the power feed connector A is inserted into the shell 54 as shown in FIG. 10, so that the front end of the shell 54 abuts against the stepped portion 1a on the outer peripheral surface of the casing 1, thus preventing a further insertion of the power feed connector. At the same time, the retaining projection 54a on the inner surface of the shell 54 is engaged in the retaining recess 39b of the lock arm 39, thereby provisionally retaining the two connectors A and B relative to each other.

Figure 11:
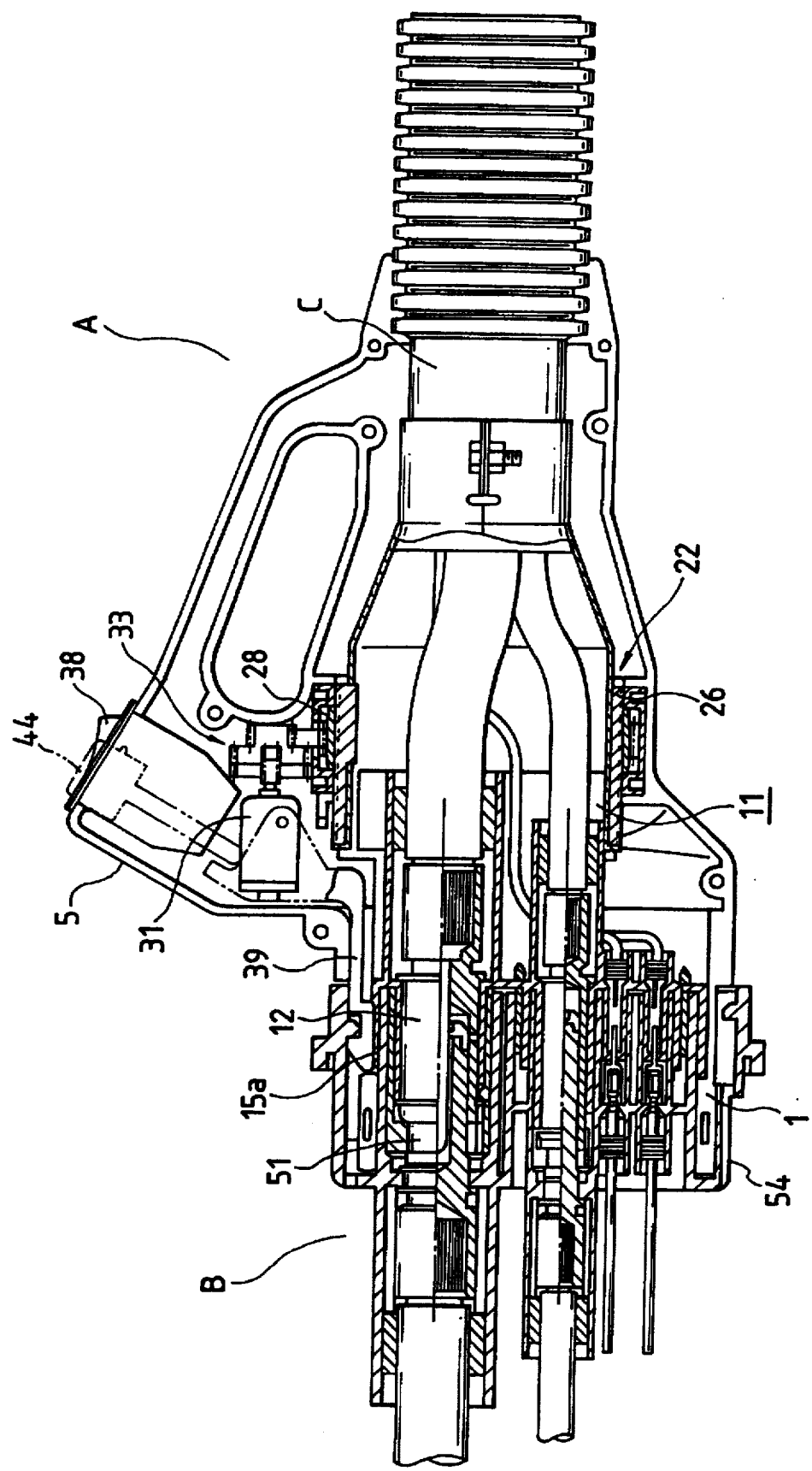
FIG. 11 is a vertical cross-sectional view showing a condition (charging condition) in which the power feed connector and the power-receiving connector are completely fitted together.

FIG. 11 shows a condition in which the two connectors A and B are completely fitted together, that is, in a charging condition.

More specifically, when the change-over switch 38 at the top of the operation chamber 5 of the power feed connector A is slidingly moved forward from a neutral position after the above provisionally-retained condition is achieved, the motor 31 is rotated in its normal direction to rotate the feed gear 28 through the speed reduction mechanism 33.

As a result, the drum 26 and the connector body 11 connected thereto are moved forwardly within the casing 1 until the complete fitting relative to the power-receiving connector B is achieved, that is, the female terminals 12 are connected to the respective male terminals 51, or the front end of the casing 1 reaches the inner end of the shell 54.

Then, when the two connectors A and B are completely fitted together, the motor 31 can not rotate any more. At this time, excess current flows in the motor 31, and this excess current is detected by a detection circuit (not shown), so that the supply of the electric power to the motor 31 is stopped.

Figure 12:
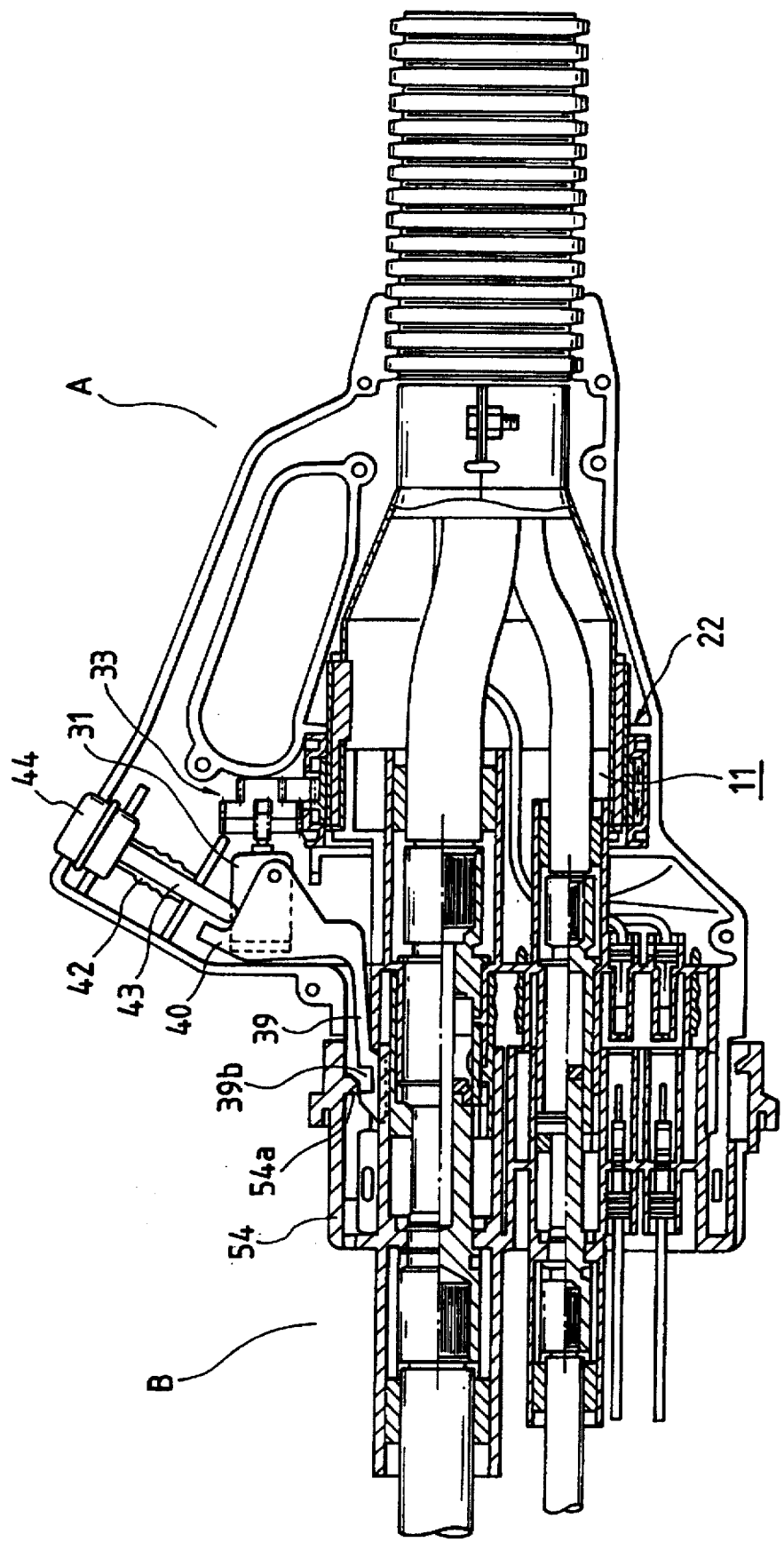
FIG. 12 is a vertical cross-sectional view showing a condition in which the power feed connector and the power-receiving connector are in a provisional retaining-released condition.
Figure 13:
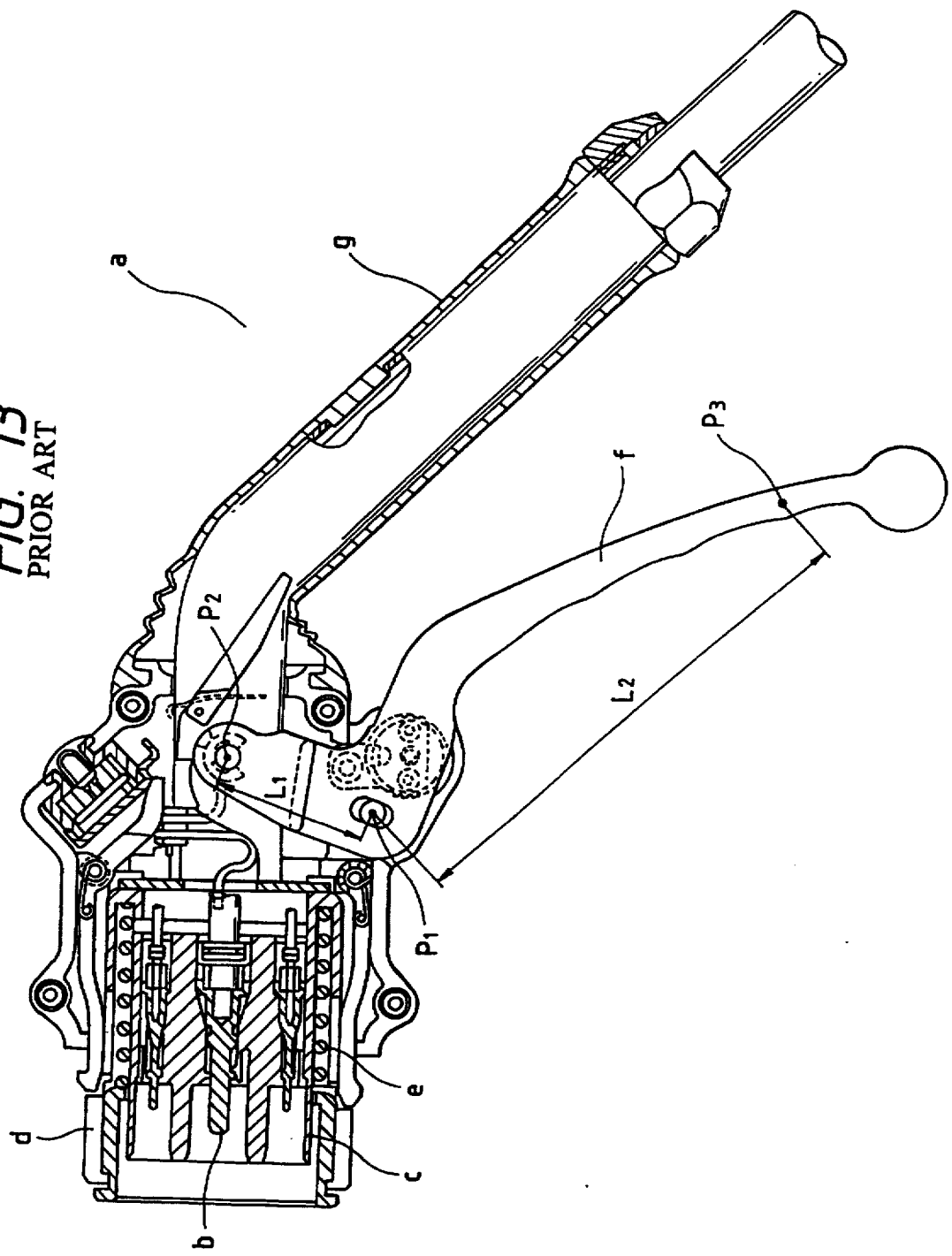
FIG. 13 is a cross-sectional view of a conventional power feed connector.

FIG. 12 shows a condition in which the two connectors A and B are in a provisional retaining-released condition.

When the change-over switch 38 is slidingly moved backward after the charging is effected, the motor 31 is rotated in a reverse direction, so that the connector body 11 moves backward through an operation reverse to the above operation. When the connector body is completely moved backward, the motor 31 can not rotate any more, and excess current produced at this time is detected, so that the supply of the electric power to the motor 31 is stopped.

Then, the head 44 of the lock release pin 43 is pushed down against the bias of the return spring 42, the lower end of this pin 43 urges the mounting frame 40 of the lock arm 39, so that the lock arm 39 is pivotally moved about the pin 41 in a counterclockwise direction. As a result, the retaining recess 39b is disengaged from the retaining projection 54a of the shell 54, thereby releasing the provisionally-retained condition of the two connectors A and B.

Even if the head 44 of the lock release pin 43 is accidentally pushed during the charging operation, the lock arm 39 will not pivotally move since the lock release prevention piece portion 15a of the connector body 11 is disposed in a path of pivotal movement of the lock arm 39, and therefore the lock release pin 43 will not be operated. Thus, the disengagement of the connector A during the charging operation is positively prevented.

In the above embodiment, although the female terminals 12, 13 and 14 are received in the power feed connector A while the corresponding male terminals 51, 52 and 53 are received in the power-receiving connector B, the two connectors may be so constructed that the female terminals can be received in the power-receiving connector whereas the male terminals can be received in the power feed connector.

Second Embodiment

Figure 14:
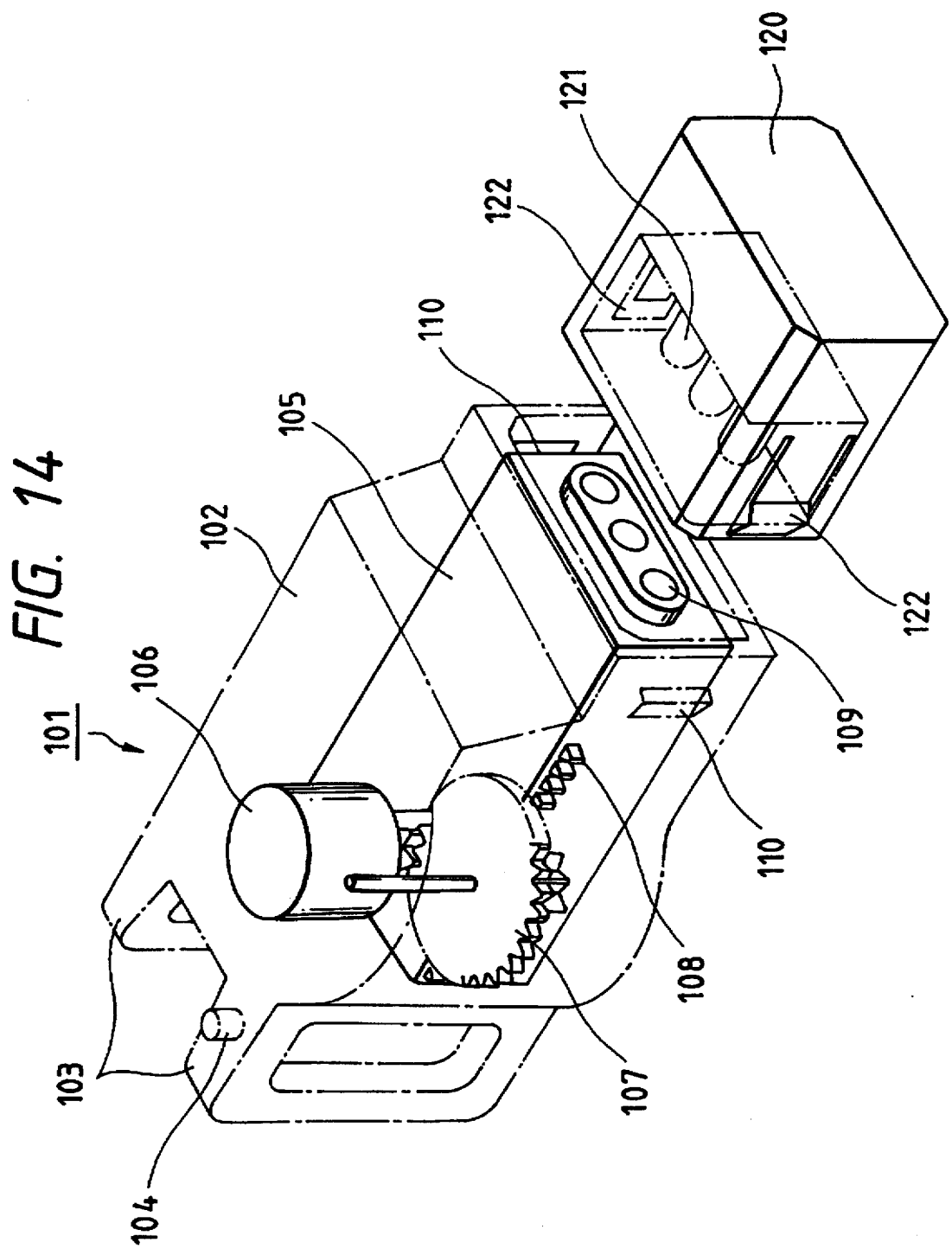
FIG. 14 is a perspective view showing a second embodiment of a power feed connector device of the present invention.

In FIG. 14, the power feed connector device 1 of the invention comprises a housing 102 of a generally rectangular parallelepipedic shape which has an open front end, and has a handle 103 and a switch 104 at its rear end, a motor (electromagnetic moving means) 106 which is fixedly mounted within the housing 102, and has a spur gear mounted on its rotation shaft, a gear 107 of a two-stage gear construction in mesh with the spur gear connected to the motor 106, and an inner housing 105 of a generally rectangular parallelepipedic shape which is movable forward and backward within the housing 102, and has a rack 108 in mesh with the gear 107, the inner housing 105 having a connector 109 received in a front end portion thereof. A pair of recess-like retaining portions 110 are formed respectively in opposite inner side surfaces of the housing 102 adjacent to the front open end thereof.

A mating housing 120 of a generally parallelepipedic shape has a mating connector 121 mounted in a front end portion thereof, and has a pair of engagement portions or projections 122 formed respectively on opposite side surfaces of the housing 120. For achieving the fitting operation, the mating housing 120 is inserted into the housing 102 through the front open end thereof, so that the mating connector 121 is connected to the connector 109.

Thus, the connector 109 constitutes a power feed connector while the mating connector 121 constitutes a power-receiving connector. The switch 104 of the power feed connector device 101 drives and stops the motor 106, and also changes the direction of rotation of the motor 106.

Figure 15:
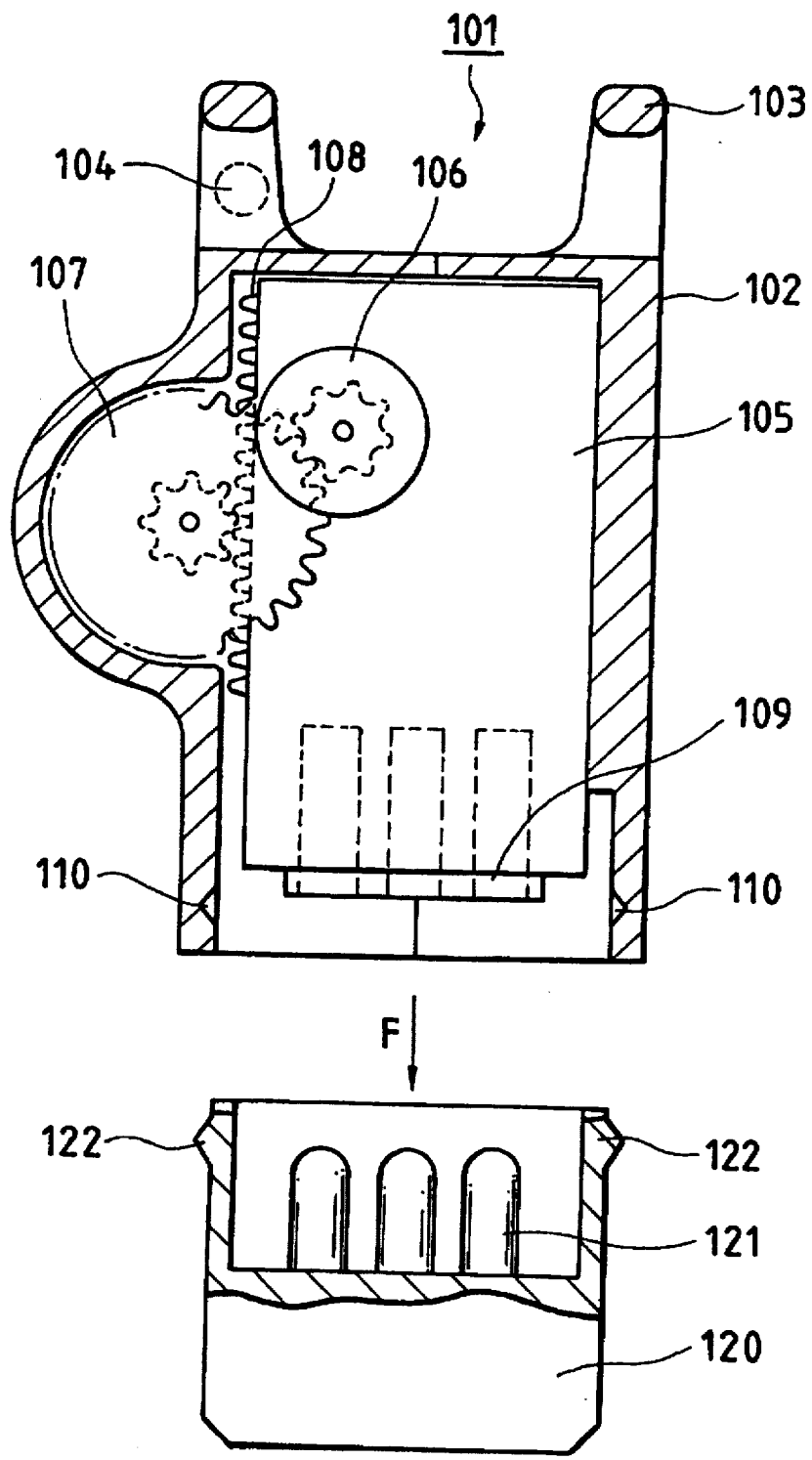
FIG. 15 is a view explanatory of the operation of the power feed connector device of FIG. 14.
Figure 16:
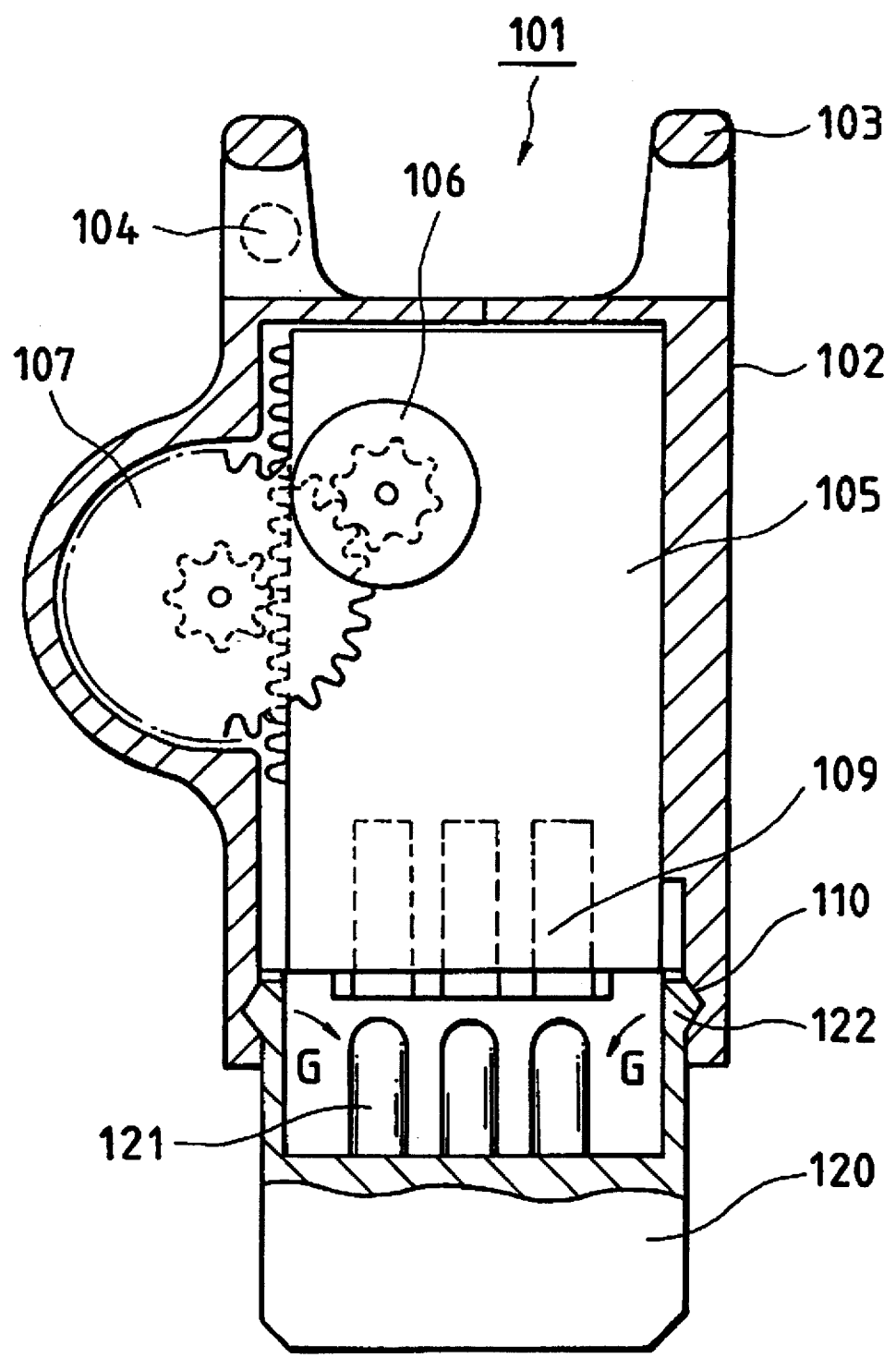
FIG. 16 is a view explanatory of the operation of the power feed connector device of FIG. 14.

The operation will now be described. In FIG. 15, the inner housing 105 is disposed at a rearmost position in the housing 102, and the motor 106 is not driven. In this condition, the handle 103 of the housing 102 is grasped, and the housing 102 is moved in a direction of arrow F, thereby fitting the front end of the housing 102 on the front end of the mating housing 120. Then, as this fitting proceeds, the engagement portions 122 of the mating housing 120 are brought into engagement with the retaining portions 110 of the housing 102, respectively, as shown in FIG. 16.

Figure 17:
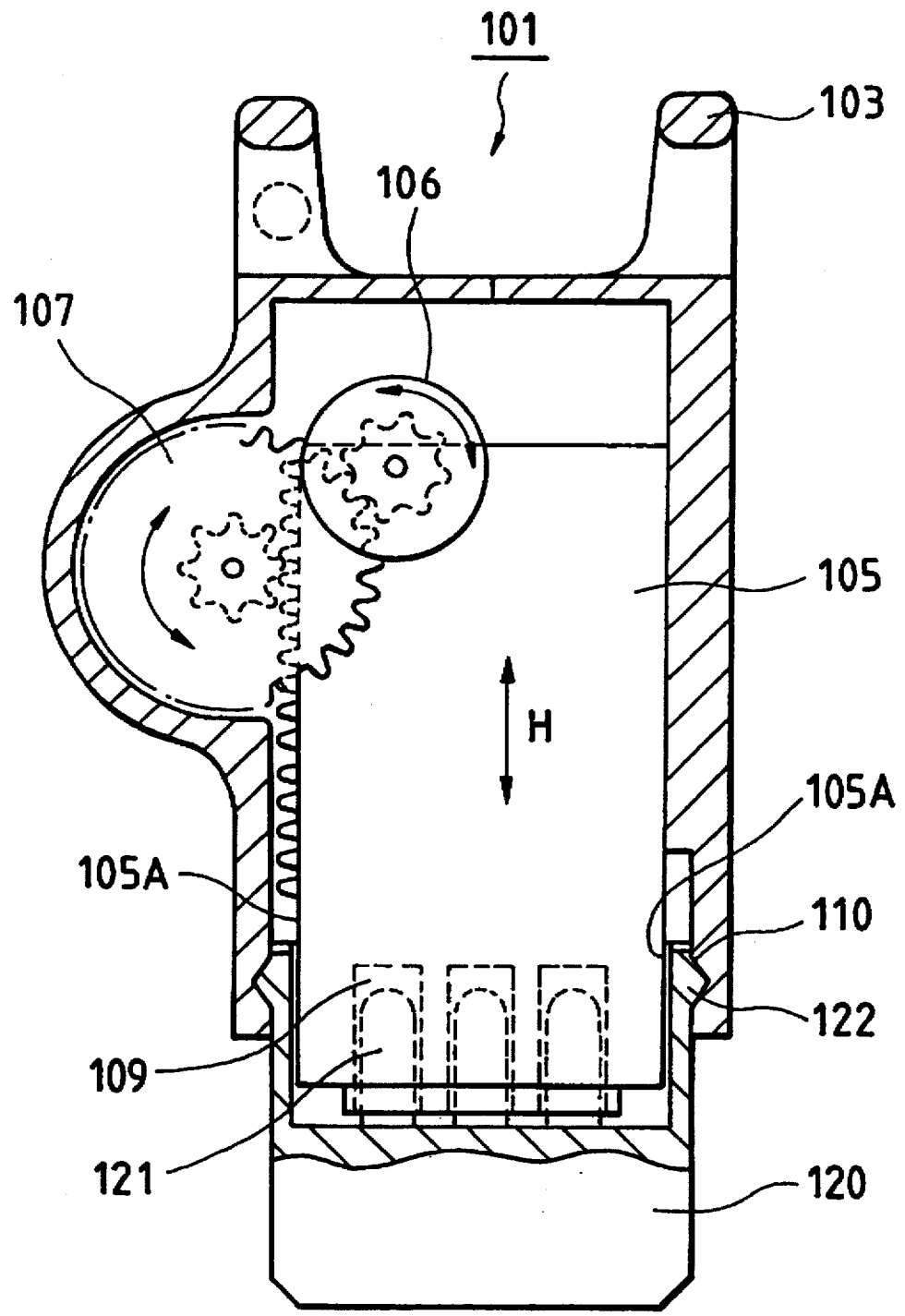
FIG. 17 is a view explanatory of the operation of the power feed connector device of FIG. 14.

Then, the switch 104 is operated to move the motor 106 in a counterclockwise direction as shown in FIG. 17, so that the gear 107 rotates in a clockwise direction to move the rack 108 forward. As a result, the inner housing 105 is moved forward, and front walls 105A of the inner housing 105 slidingly move along the inner surfaces of the mating housing 120, so that the engagement portions 122 are retained respectively in the retaining portions 110 against movement, thereby preventing each engagement portion 122 from being displaced in a direction of arrow G (see FIG. 16). As a result, the mating housing 120 is firmly retained relative to the housing 102.

When the motor 106 is further rotated in the counterclockwise direction, the inner housing 105 further moves forward, so that the connector 109 is connected to the mating connector 121.

As described above, the power feed connector 109 is automatically connected to the power-receiving connector 121 by the electromagnetic moving means constituted by the motor 106.

For automatically disengaging the power feed connector 109 from the power-receiving connector 121, the switch 104 is operated to rotate the motor 106 in the reverse direction, that is, counterclockwise direction.

Third Embodiment

Figure 18:
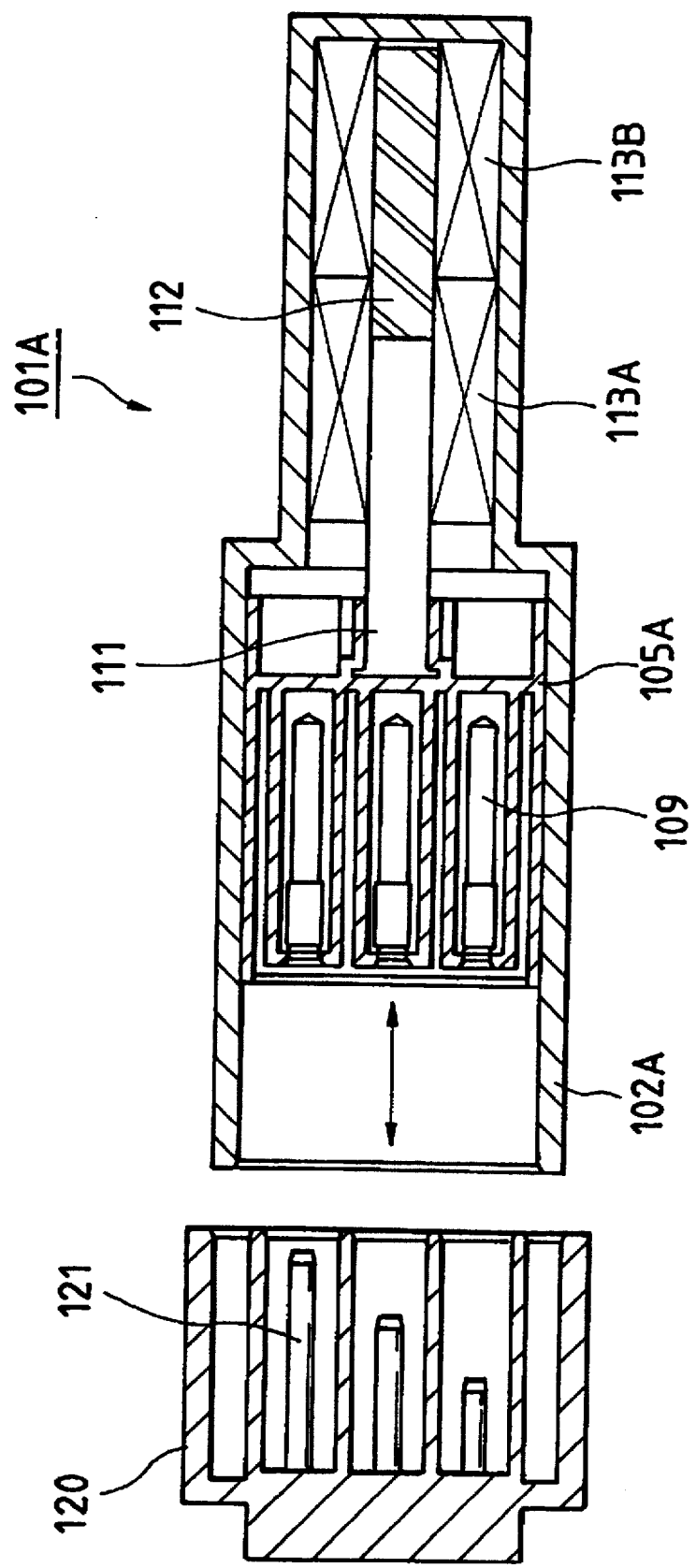
FIG. 18 is a cross-sectional view of a third embodiment of a power feed connector device of the invention.

FIG. 18 is a cross-sectional view of a third embodiment of a power feed connector device of the invention. In the power feed connector device 101A shown in FIG. 18, a rod 111 of a non-magnetic material (e.g. synthetic resin) extends rearwardly from a rear end of an inner housing 105A, and an armature 112 of a magnetic material extends from a rear end of the rod 111. Two annular electromagnets 113A and 13B are mounted on the rod 111 and the armature 112 in sliding contact with outer peripheral surfaces thereof, and are juxtaposed in the axial direction. Namely, in this embodiment, electromagnetic moving means is achieved by the solenoid defined by the rod 111, the armature 112 and the electromagnets 113A and 113B.

In the condition shown in FIG. 18, the armature 112 is located at its right end position, and therefore the inner housing 105A is located at its right end position. Here, a mating connector 120 is retained on the housing 102A as described above in the preceding embodiment, and then when the front electromagnet 113A is driven, the armature 112 is attracted by the electromagnet 113A to be moved to the left in FIG. 18. As a result, the inner housing 105A is also moved to the left, so that a power feed connector 109 is automatically connected to a power-receiving connector 121.

For releasing the connection, the rear electromagnet 113B is driven.

Fourth Embodiment

Figure 19:
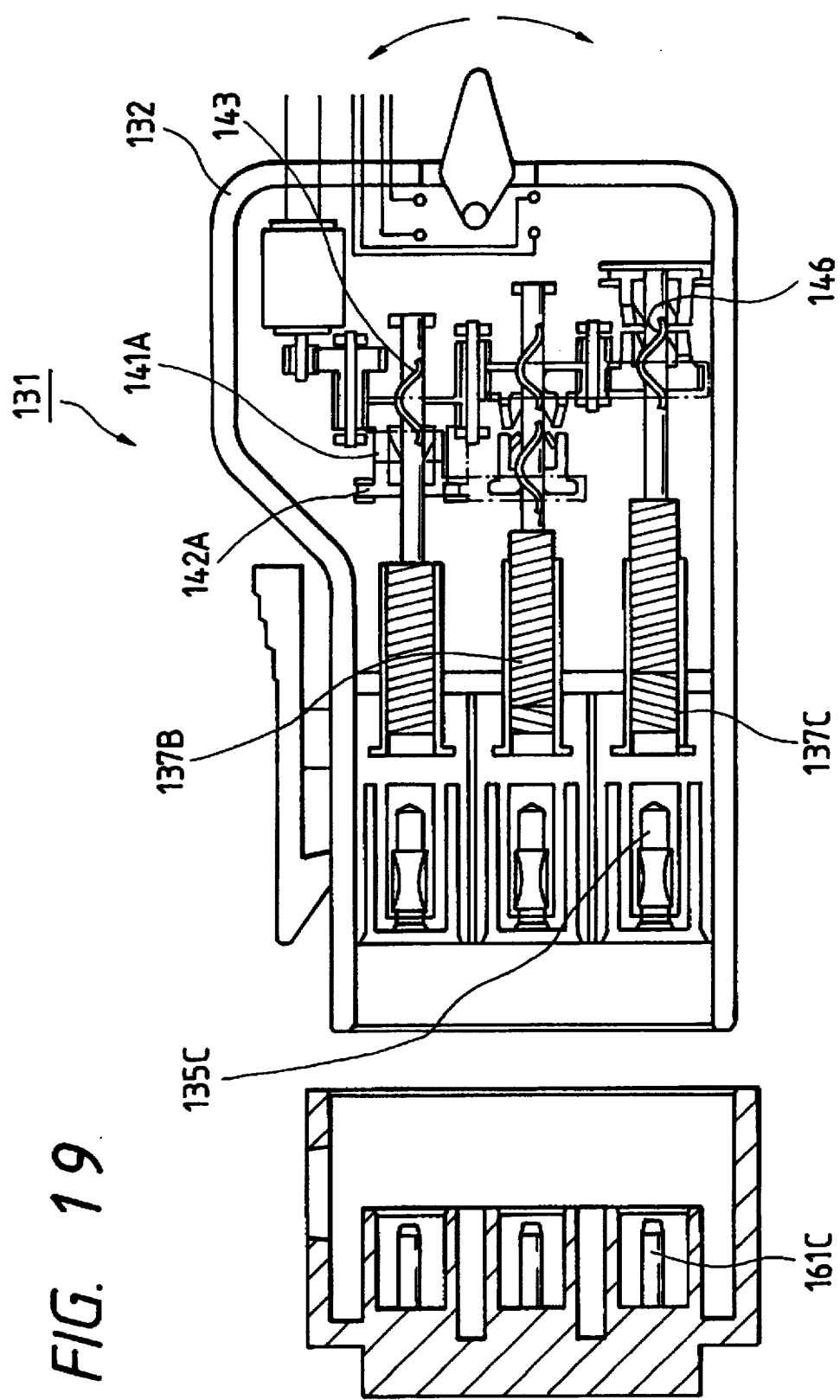
FIG. 19 is a cross-sectional view of a fourth embodiment of a power feed connector device of the invention.

FIG. 19 is a cross-sectional view of a fourth embodiment of a power feed connector device of the invention. FIGS. 20 to 23 are views explanatory of a connecting operation for the power feed connector device of FIG. 19. FIGS. 24 to 27 are views explanatory of a releasing operation.

The power feed connector device 131 of the invention shown in these Figures comprises a first terminal housing 133A, a second terminal housing 133B, and a third terminal housing 133C which are contained in a housing 132, and are movable forward and backward (left and right in the drawings). The first terminal housing 133A includes a first terminal 135A provided at its front portion, and a first sheath 134A provided at its rear portion which sheath has a spiral groove formed in an inner surface thereof. The second terminal housing 133B includes a second terminal 135B provided at its front portion, and a second sheath 134B provided at its rear portion which sheath has a spiral groove formed in an inner surface thereof. The third terminal housing 133C includes a third terminal 135C provided at its front portion, and a third sheath 134C provided at its rear portion which sheath has a spiral groove formed in an inner surface thereof.

A first feed screw portion 137A is threadedly engaged with the spiral groove of the first sheath 134A, and a first feed shaft 136A extends from a rear end of the first feed screw portion 137A. A first clutch 142A is fixedly mounted on the outer periphery of the first feed shaft 136A, and a first clutch spur gear 141A is mounted slidably and rotatably on the outer periphery of the first feed shaft 136A in opposed relation to the first clutch 142A. A first wire spring 143 is embedded in the first feed shaft 136A, and has a slanting surface slanting downwardly left from its central portion, and a slanting surface slanting downwardly right from its central portion, and the central portion of this spring 143 is slightly projected from the outer peripheral surface of the shaft. The rotation of the first feed shaft 136A causes the first feed screw portion 137A to rotate, and the first sheath 134A threaded thereon is fed forward and backward, so that the first terminal housing 133A is moved forward and backward.

A second feed screw portion 137B is threadedly engaged with the spiral groove of the second sheath 134B, and a second feed shaft 136B extends from a rear end of the second feed screw portion 137B. A second clutch 142B is mounted on the outer periphery of the second feed shaft 136B for rotation therewith and for sliding forward and backward movement therealong, and a second clutch spur gear 141B is mounted slidably and rotatably on the outer periphery of the second feed shaft 136B in opposed relation to the second clutch 142B. A second front wire spring 144 is embedded in a front portion of the second feed shaft 136B, and has a slanting surface slanting downwardly left from its central portion, and a slanting surface slanting downwardly right from its central portion, and the central portion of this spring 144 is slightly projected from the outer peripheral surface of the shaft. A second rear wire spring 145 is embedded in a rear portion of the second feed shaft 136B, and has a slanting surface slanting downwardly left from its central portion, and a slanting surface slanting downwardly right from its central portion, and the central portion of this spring 145 is slightly projected from the outer peripheral surface of the shaft.

The rotation of the second feed shaft 136B causes the second feed screw portion 137B to rotate, and the second sheath 134B threaded thereon is fed forward and backward, so that the second terminal housing 133B is moved forward and backward.

A third feed screw portion 137C is threadedly engaged with the spiral groove of the third sheath 134C, and a third feed shaft 136C extends from a rear end of the third feed screw portion 137C. A third clutch 142C is fixedly mounted on the outer periphery of the third feed shaft 136C, and a third clutch spur gear 141C is mounted slidably and rotatably on the outer periphery of the third feed shaft 136C in opposed relation to the third clutch 142C. A third wire spring 146 is embedded in the third feed shaft 136C, and has a slanting surface slanting downwardly left from its central portion, and a slanting surface slanting downwardly right from its central portion, and the central portion of this spring 146 is slightly projected from the outer peripheral surface of the shaft.

The rotation of the third feed shaft 136C causes the third feed screw portion 137C to rotate, and the third sheath 134C threaded thereon is fed forward and backward, so that the third terminal housing 133C is moved forward and backward.

A motor 138, which is driven by a switch 150, and has a first spur gear 139A mounted on its rotation shaft, and a first two-stage spur gear 140, meshingly engaged with the first spur gear 139A and the first clutch spur gear 141A, are mounted within the housing 132. A second spur gear 139B, meshingly engaged with the first clutch spur gear 141A and the second clutch spur gear 41B, and a third spur gear 139C, meshingly engaged with the second clutch spur gear 141B and the third clutch spur gear 141C, are also mounted within the housing 132.

The first clutch spur gear 141A and the second clutch 142B are movable while maintaining the positional relation therebetween through a second gear slider 148. The second clutch spur gear 141B and the third clutch spur gear 141C are movable while maintaining the positional relation therebetween through a third gear slider 149.

A mating housing 160 to be retained relative to the housing 132 contains a mating first terminal 161A, a mating second terminal 161B and a mating third terminal 161C which are connected respectively to the first terminal 135A, the second terminal 135B and the third terminal 136C.

Figure 20:
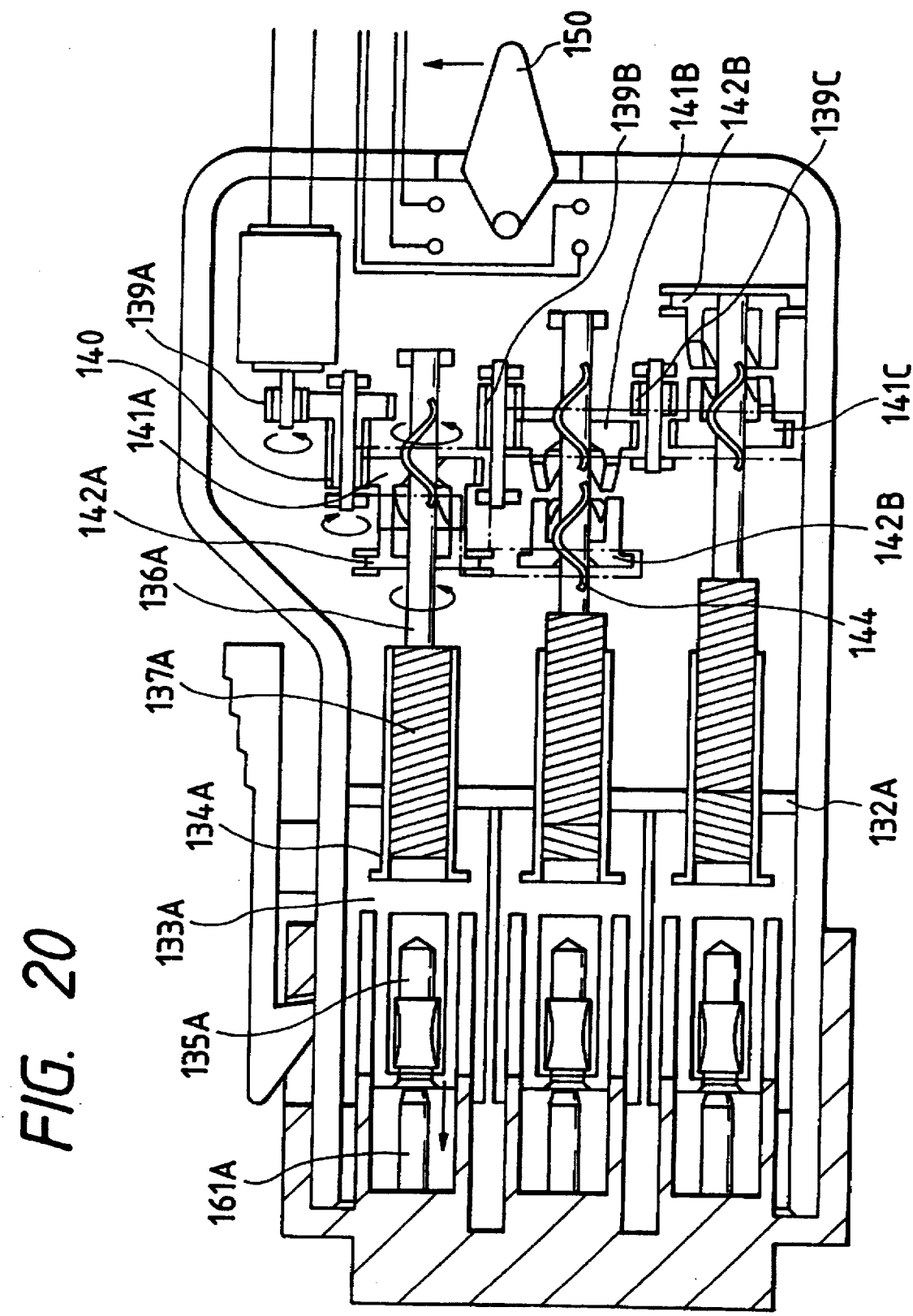
FIG. 20 is a view explanatory of a connecting operation of the power feed connector device of FIG. 19.

Next, the connecting operation will be described below. In FIG. 20, when the switch 150 is turned to the forward side, the motor 138 and the first spur gear 139A rotate, and this rotation is transmitted to the first clutch spur gear 141A through the first two-stage spur gear 140. Since first clutch spur gear 141A is contacted at its inner periphery with the left slanting surface of the first wire spring 143, and is urged forwardly, the first clutch spur gear 141A is engaged with the first clutch 142A to rotate this first clutch 142A. The rotation of the first clutch 142A causes the first feed shaft 136A and the first feed screw portion 137A to rotate, so that the first sheath 134A and the first terminal housing 133A move forward.

In the above condition, since the first clutch spur gear 141A is held in a forward position under the influence of the wire spring 143, the first clutch spur gear 141A is disengaged from the second spur gear 139B, and therefore the rotation of the motor 138 is not transmitted to the second clutch spur gear 141B. Similarly, the second clutch spur gear 141B is disengaged from the third spur gear 139C, and therefore the rotation of the motor 138 is not transmitted to the third clutch spur gear 141C.

Figure 21:
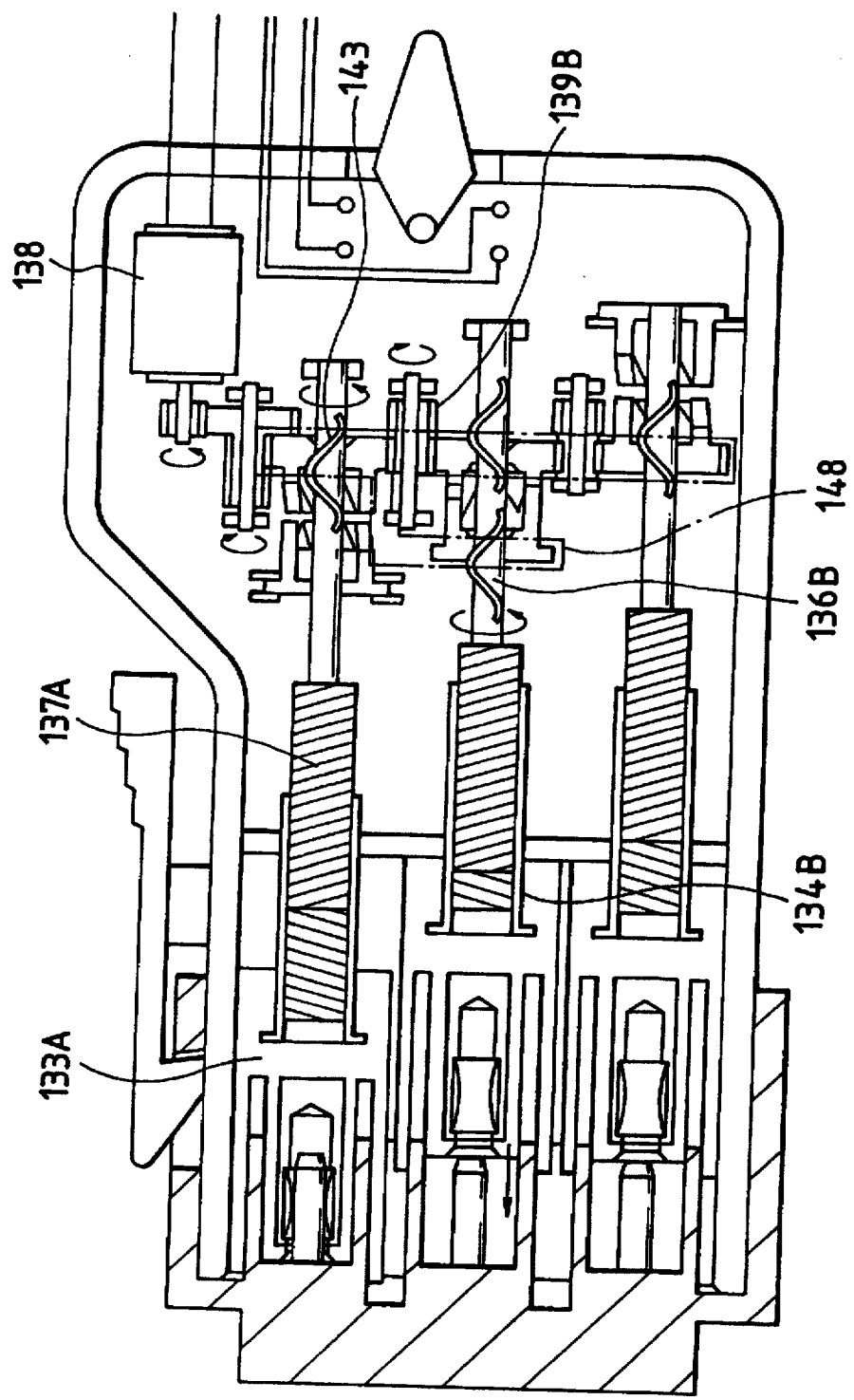
FIG. 21 is a view explanatory of the connecting operation of the power feed connector device of FIG. 19.

Then, when the first terminal 135A is connected to the mating first terminal 161A in the mating housing 160 as shown in FIG. 21, the first terminal housing 133A reaches its left end position, and is stopped. However, since the motor 138 continues to rotate, the torque is increased, and the teeth of the first clutch 142A slide, so that the first clutch spur gear 141A is moved backwardly, thereby releasing the engagement. As a result, the rotation ceases to be transmitted to the first clutch 142A, so that the rotation of the first feed shaft 136A and the first feed screw portion 137A is stopped. The backwardly-moved first clutch spur gear 141A slides over the central portion of the first wire spring 143, and comes into contact with the right slanting surface thereof. As a result of this backward movement of the first clutch spur gear 141A, the first two-stage spur gear 140 is engaged with the second spur gear 139B, so that the rotation of the first two-stage spur gear 140 is transmitted to the second clutch spur gear 41B through the second spur gear 139B. On the other hand, the backward movement of the first clutch spur gear 41A causes the second gear slider 148 to move backward, so that the second clutch 142B is also moved backward. As a result, the second clutch spur gear 141B is engaged with the second clutch 142B to rotate the second feed shaft 136B and the second feed screw portion 137B, so that the second sheath 134B and the second terminal housing 133B are moved forward.

In the above condition, the inner periphery of the second clutch spur gear 141B is in contact with the left slanting surface of the second rear wire spring 145, and the inner periphery of the second clutch 142B is in contact with the right slanting surface of the second front wire spring 144.

Figure 22:
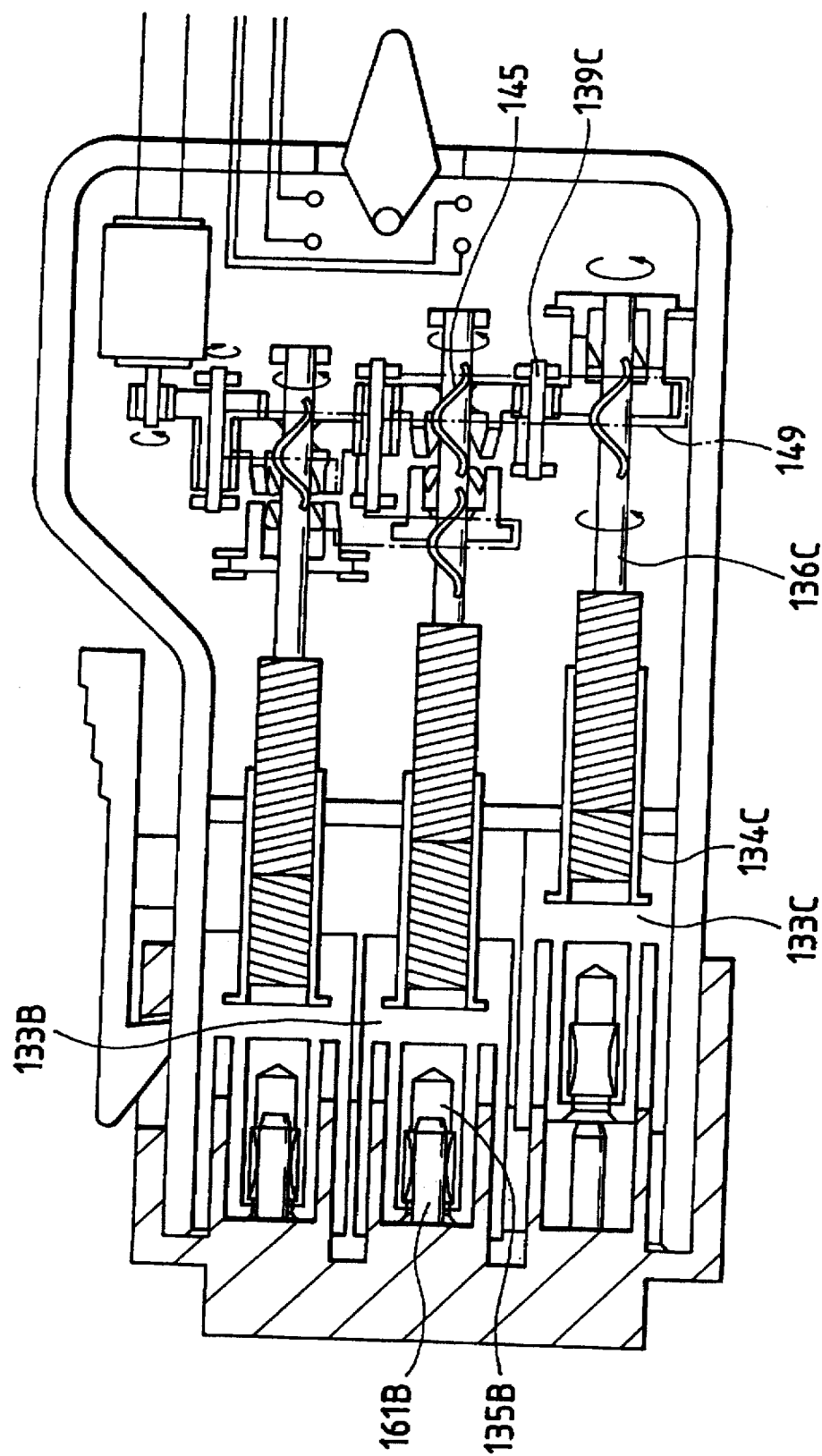
FIG. 22 is a view explanatory of the connecting operation of the power feed connector device of FIG. 19.

Then, when the second terminal 135B is connected to the mating second terminal 161B in the mating housing 160 as shown in FIG. 22, the second terminal housing 133B reaches its left end position, and is stopped. However, since the motor 138 continues to rotate, the torque is increased, and the teeth of the second clutch 142B slide, so that the second clutch spur gear 141B is moved backwardly, thereby releasing the engagement. As a result, the rotation ceases to be transmitted to the second clutch 142B, so that the rotation of the second feed shaft 136B and the second feed screw portion 137B is stopped. The backwardly-moved second clutch spur gear 141B slides over the central portion of the second rear wire spring 145, and comes into contact with the right slanting surface thereof. As a result of this backward movement of the second clutch spur gear 141B, the second clutch spur gear 141B is engaged with the third spur gear 139C.

On the other hand, the backward movement of the second clutch spur gear 141B causes the third gear slider 149 to move backward, so that the third clutch spur gear 141C is also moved backward. As a result, the third clutch spur gear 141C is engaged with the third spur gear 139C, and also the third clutch spur gear 141 is engaged with the third clutch 142C, so that the third feed shaft 36C and the third feed screw portion 137C rotate, thereby feeding the third sheath 134C and the third terminal housing 133C forwardly.

Figure 23:
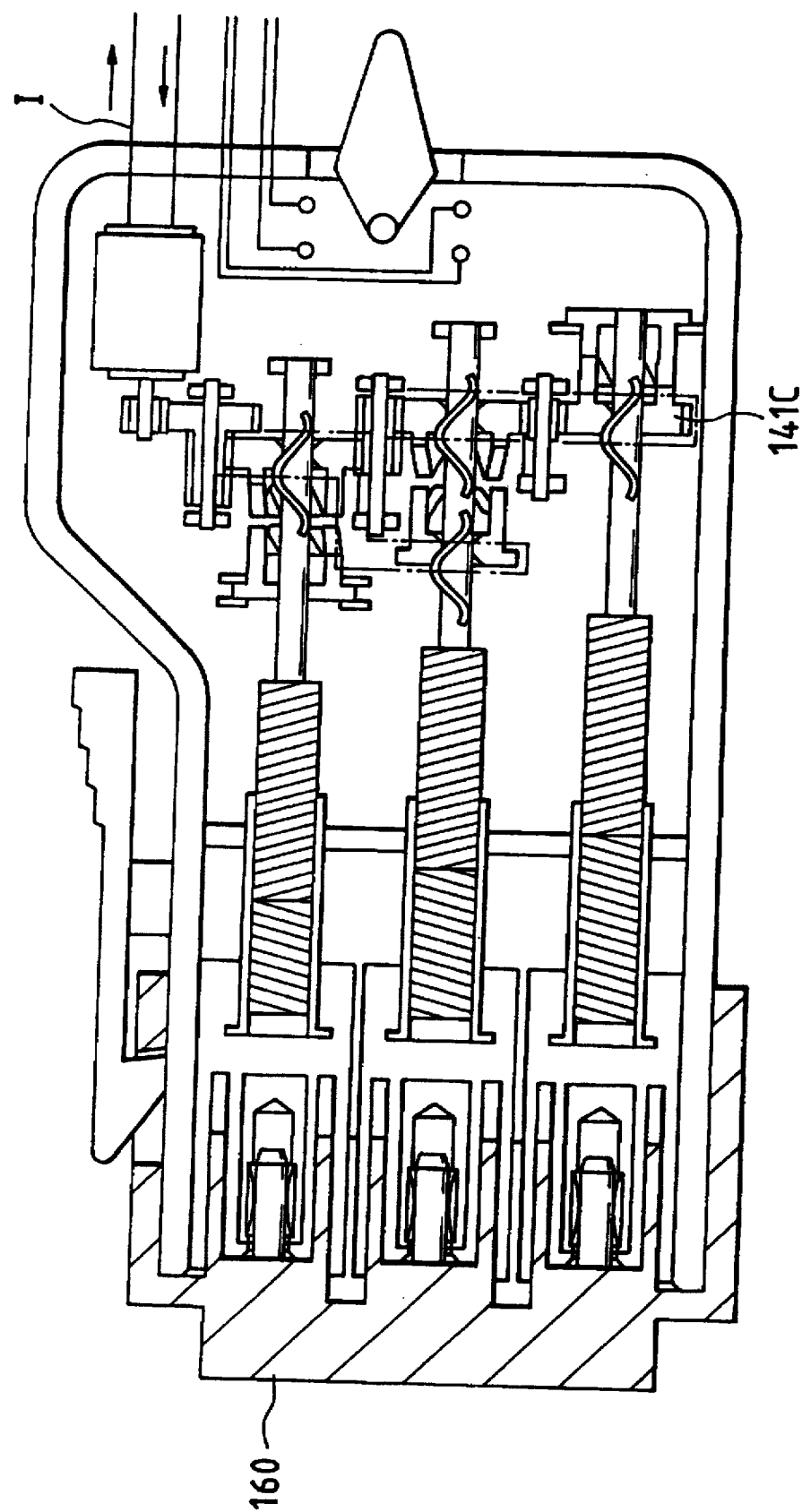
FIG. 23 is a view explanatory of the connecting operation of the power feed connector device of FIG. 19.

Then, when the third terminal 135C is connected to the mating third terminal 161C in the mating housing 160 as shown in FIG. 23, the third terminal housing 133C reaches its left end position, and is stopped. However, since the motor 38 continues to rotate, the torque is increased, so that excess current I flows in the motor 138. When a controller (not shown) detects this excess current, the switch 150 is automatically opened.

As described above, the three pairs of male and female terminals are sequentially fitted together one pair after another with a time difference. The torque of the motor constituting the electromagnetic moving means need only to be slightly larger than that required for connecting one pair of terminals together, and therefore the constituent parts can be made smaller, and the cost can be reduced.

As shown in FIGS. 24 to 27, the terminals thus connected together can be sequentially disengaged according to a procedure reverse to the above operation.

Figure 24:
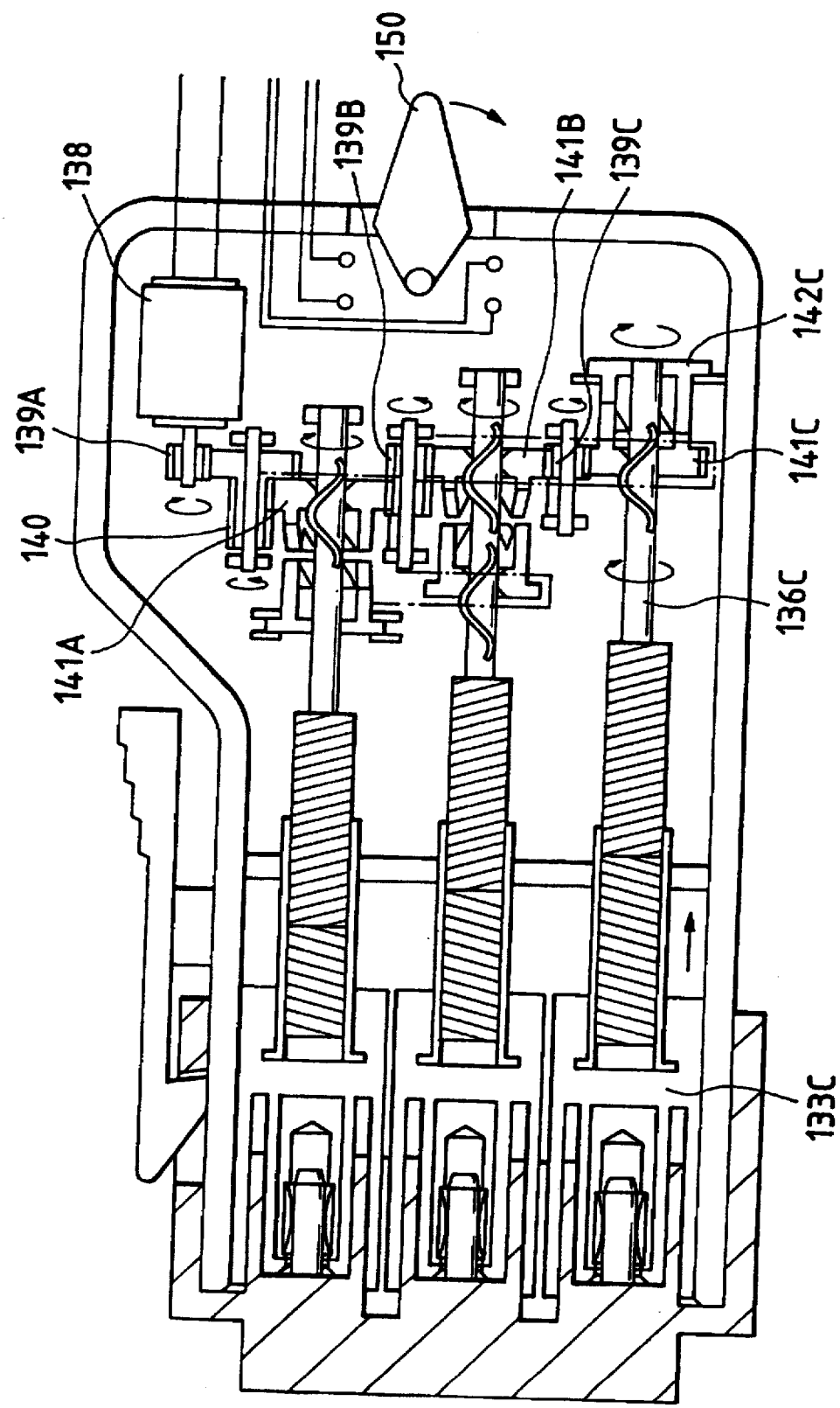
FIG. 24 is a view explanatory of a disconnecting operation of the power feed connector device of FIG. 19.
Figure 25:
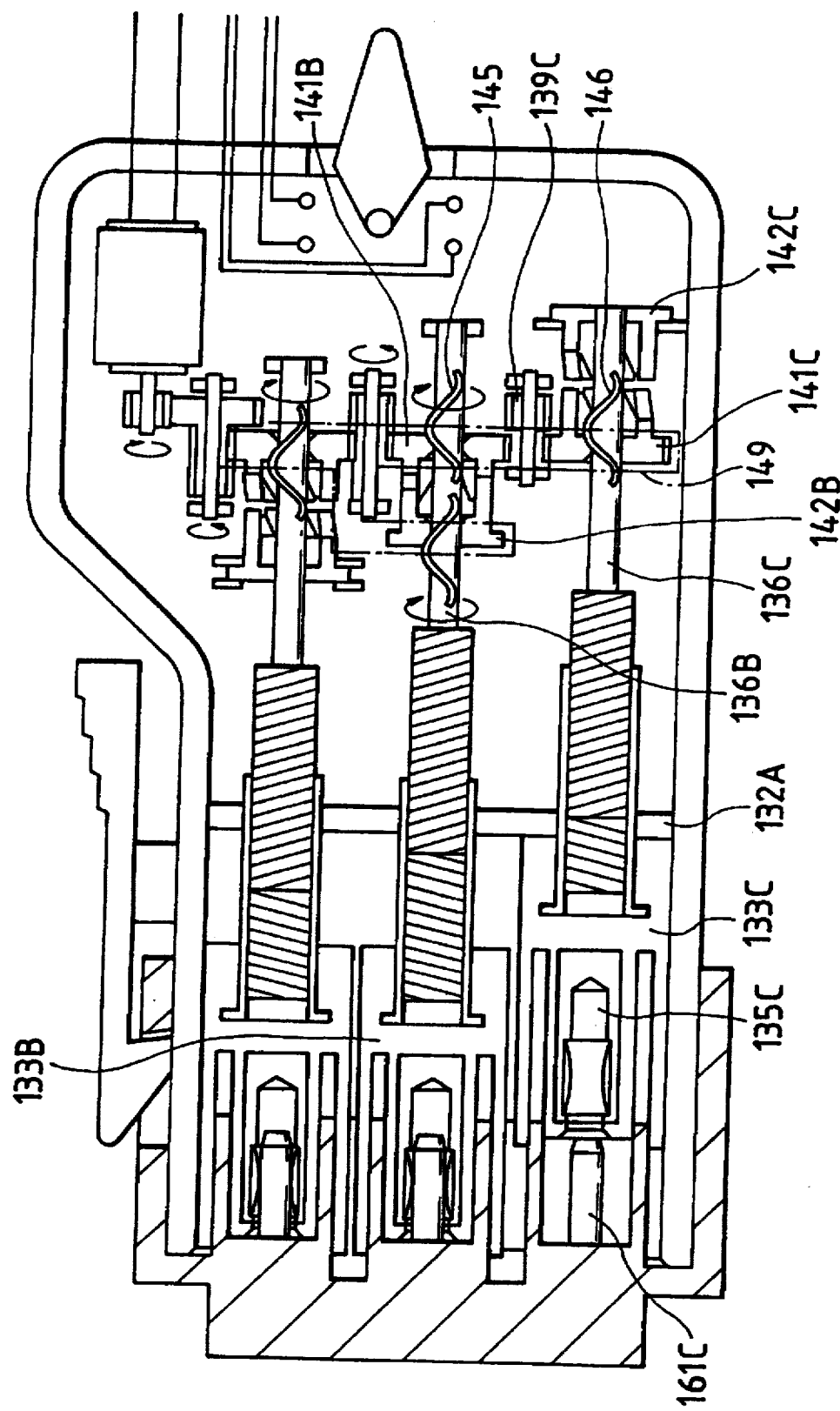
FIG. 25 is a view explanatory of a disconnecting operation of the power feed connector device of FIG. 19.

In FIG. 24, when the switch 150 is moved toward a backward side, the motor 138 rotates in a reverse direction, and the third feed shaft 136C rotates in a reverse direction to move the third terminal housing 133C backward, thereby disengaging the third terminal 135C from the mating third terminal 161C. Then, when the third terminal housing 133C reaches an insertion wall 132A to be stopped as shown in FIG. 25, the torque is increased, so that the third clutch 142C moves the third clutch spur gear 141C forward to release the engagement. The third clutch spur gear 141C thus moves forward to release the engagement with the third spur gear 139C, and also the third gear slider 149 moves to cause the second clutch spur gear 141B to move forward. The second clutch spur gear 141B thus moves forward to slide over the central portion of the second rear wire spring 145, and comes into contact with the left slanting surface of this wire spring, and the second clutch spur gear 141B is urged forward to be engaged with the second clutch 142B. As a result, the rotation of the motor 138 is transmitted to the second feed shaft 136B through the second clutch spur gear 41B and the second clutch 142B, and the second terminal housing 133B begins to move backward, thereby disengaging the second terminal 135B from the mating second terminal 161B.

Figure 26:
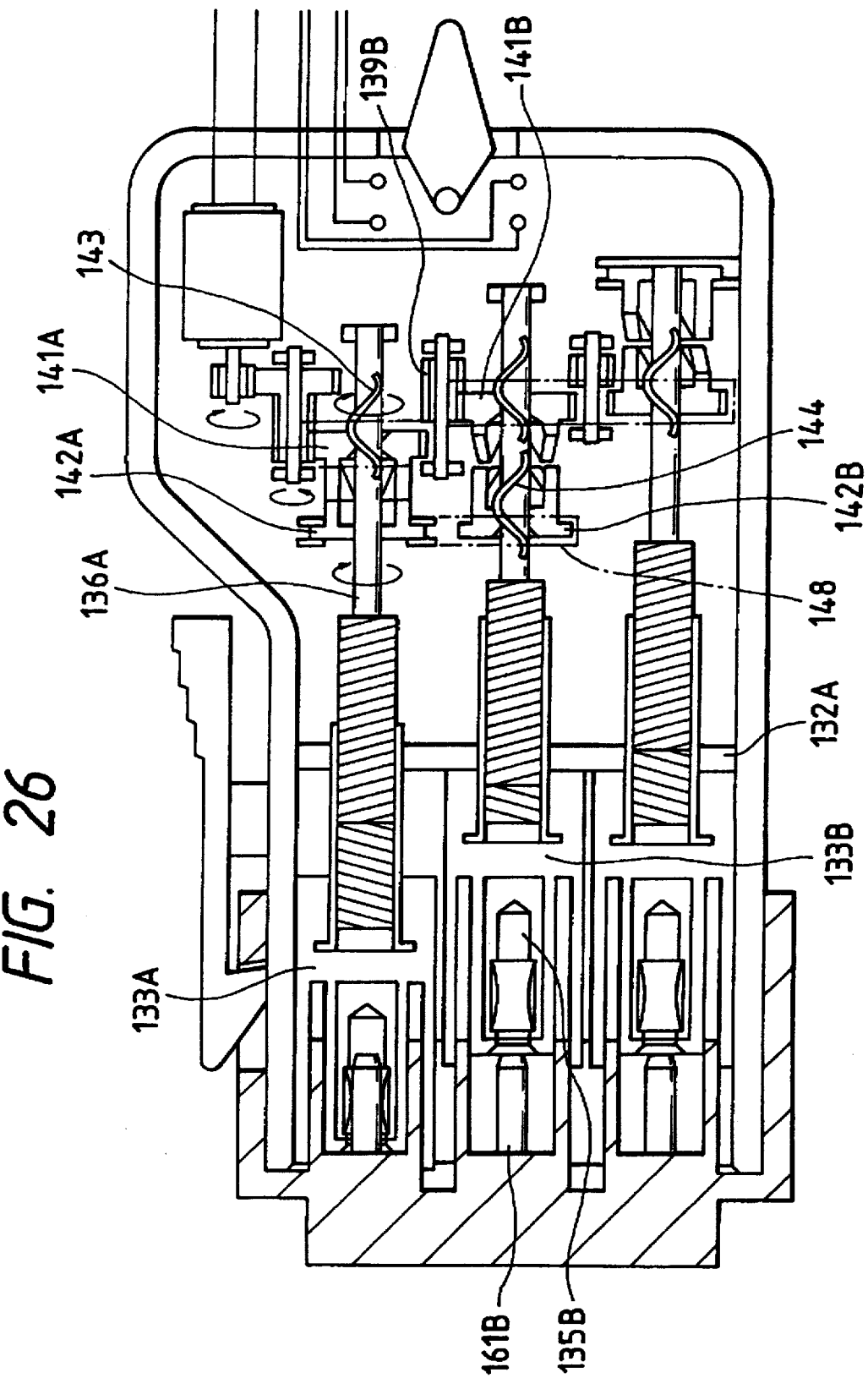
FIG. 26 is a view explanatory of a disconnecting operation of the power feed connector device of FIG. 19.

Then, when the second terminal housing 133B reaches the insertion wall 132A to be stopped as shown in FIG. 26, the torque is increased, so that the second clutch spur gear 141B urges the second clutch 142B forward, thereby releasing the engagement. As a result of the forward movement of the second clutch 142B, the second gear slider 148 also moves forward to move the first clutch spur gear 141A forward. As a result, the first clutch spur gear 141A slides over the central portion of the first wire spring 143, and comes into contact with the left slanting surface thereof. The first clutch spur gear 141A is urged forward to be engaged with the first clutch 142A. As a result, the rotation of the motor 138 is transmitted to the first feed shaft 36A, and the first terminal housing 133A begins to move backward, thereby disengaging the first terminal 135A from the mating first terminal 161A.

Figure 27:
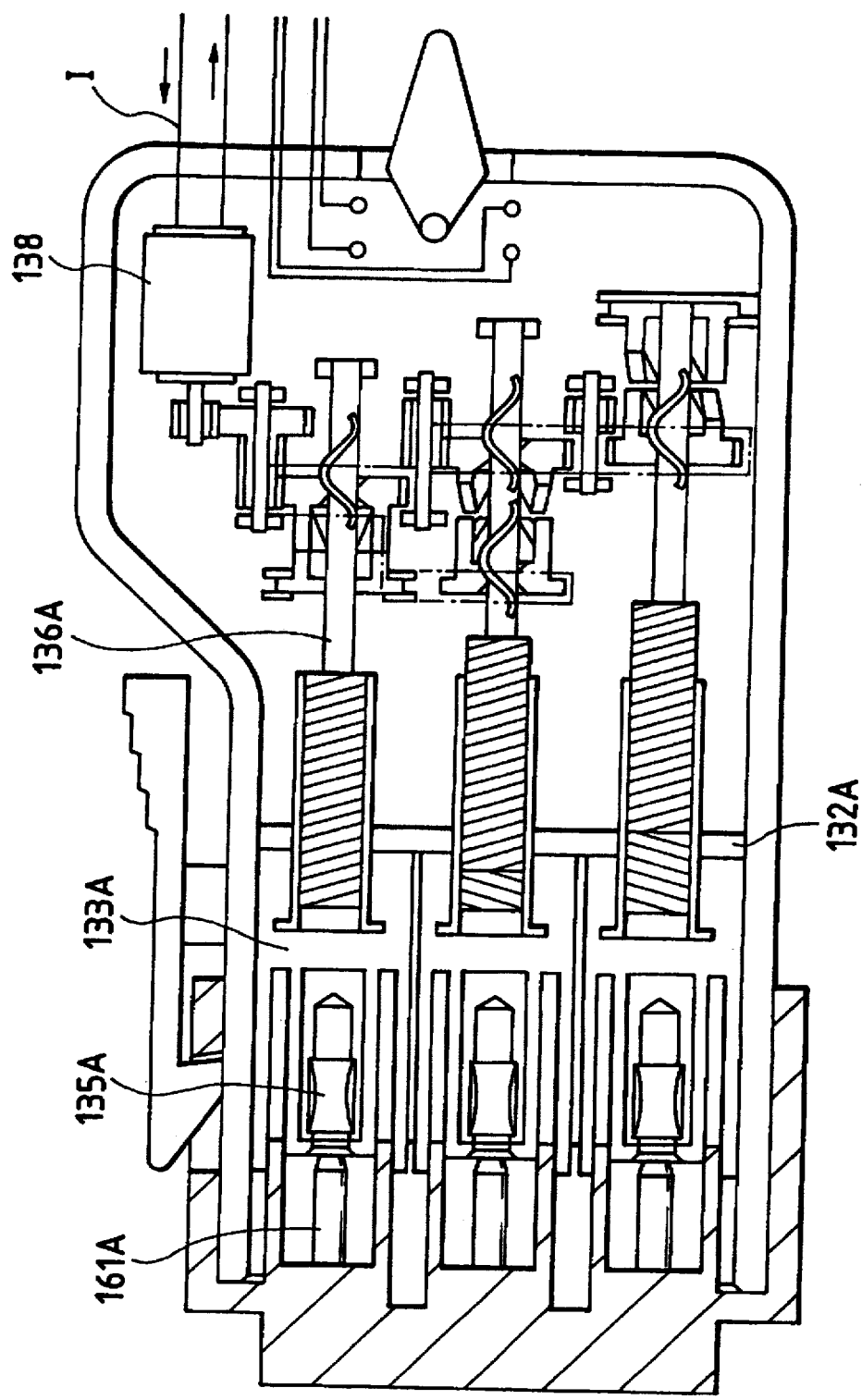
FIG. 27 is a view explanatory of a disconnecting operation of the power feed connector device of FIG. 19.

Then, when the first terminal housing 133A reaches the insertion wall 132A to be stopped as shown in FIG. 27, the torque is increased, so that excess current flows in the motor 138. The controller (not shown) detects this excess current, so that the switch 150 is automatically opened. Thus, the release of all the connections is completed.

As described above, the three pairs of male and female terminals are sequentially disconnected one pair after another with a time difference, and the toque of the motor constituting the electromagnetic moving means need only to be slightly larger than that required for disengaging one pair of terminals from each other.

Preferably, among the three pairs of terminals, the ones to be first connected together and disconnected last should be the grounding terminals, the ones to be connected together secondly and disconnected secondly should be the main power source connectors, and the ones to be connected last and disconnected first should be the signal terminals.

As described above, in the power feed connector of the present invention, the connector body can be moved forward and backward by the rotation of the motor, and therefore the fitting and disengagement of the power feed connector relative to the power-receiving connector can be effected quite easily by the switching operation of the change-over switch. And besides, a large propelling force is applied to the connector body through the speed reduction mechanism, and therefore this construction is suited for the development of a large-size connector for supplying large current.

As described above, in the power feed connector-connecting method of the invention, at least one of the pair of male and female connectors is moved forward and backward along the fitting axis by the electromagnetic moving means, thereby fitting the two connectors together and disengaging the two connectors from each other. With this construction, the power feed portion and the power-receiving portion can be automatically connected together and disconnected from each other. Therefore, connectors for supplying large current, or high-density multi-pole connectors can be connected together and disconnected from each other with a low insertion/withdrawal force.

The power feed connector device of the present invention contains the electromagnetic moving means in the form of an electric motor or a solenoid which moves at least one of the pair of male and female connectors forward and backward along the fitting axis so as to fit the two connectors together and to disengage the two connectors from each other. Therefore, there can be achieved the power feed connector device in which the power feed portion and the power-receiving portion can be automatically connected together and disconnected from each other.

In the power feed connector-connecting method of the invention, the plurality of pairs of male and female connectors are sequentially fitted together and disconnected one pair after another with a time difference. Therefore, each pair of connectors can be connected together and disconnected from each other with a low insertion/withdrawal force. If the order of connection and disconnection of the pairs of the connectors is so determined that the grounding connectors are first connected together and disconnected from each other last, an electric shock accident is prevented, thus securing the safety.

The power feed connector device of the present invention contains the electromagnetic moving means by which the plurality of pairs of male and female connectors are sequentially fitted together and disconnected one pair after another with a time difference. Therefore, there can be achieved the power feed connector device in which the power feed portions and the power-receiving portions can be automatically connected together and disconnected from each other in a desired order.

What is claimed is:

1. A connector;
   a tubular casing;
   a connector body slidably mounted on said casing, said connector body having at least one terminal received therein; and
   a motor mounted within said casing, said motor being connected to a rear half portion of said connector body through a speed reduction mechanism so as to move said connector body forward and backward, wherein said casing includes a lock arm for engagement with a mating connecting upon fitting of said connector relative to said mating connector, and a lock release pin for releasing the locking arm of said lock arm.

2. A connector according to claim 1, in which said connector body has a lock release prevention piece portion for preventing the locking of said lock arm from being released when said connector and said mating connector are completed fitted together.

3. A connector comprising:
   a tubular casing having a connector receiving chamber at its front half portion and a feed gear receiving chamber at its rear half portion, said casing also having an operation chamber at a side portion thereof;
   a connector body slidably mounted within said connector receiving chamber of said casing, said connector body having a plurality of terminals received therein;
   a motor fixedly mounted within said operation chamber;
   a feed gear mounted within said feed gear receiving chamber, said feed gear being connected to said motor through a speed reduction mechanism, and said feed gear having threads formed on a peripheral surface thereof; and
   a cylindrical member connected to and circumscribing a rear portion of said connector body, said cylindrical member being threadedly engaged with said feed gear so as to move said connector body forward and backward when said motor is rotated in normal and reverse directions.

4. A connector according to claim 3, in which wires, connected respectively to said plurality of terminals within said connector body, are passed through a bore of said cylindrical member to the exterior of said connector.

5. A connector according to claim 4, in which said cylindrical member is fitted on a metal shell, fixed to a rear end portion of said connector body, against rotation relative to said metal shell, and wires, connected respectively to said plurality of terminals, are gathered into a bundle by said metal shell.

6. A connector according to claim 4, in which said connector body has a plurality of connectors connected to said cylindrical member, respectively, and said cylindrical member is connected to said feed gear, respectively.

7. A connector comprising:
   a tubular casing;
   a connector body slidably mounted on said casing, said connector body having at least one terminal received therein;
   a solenoid for moving said connector body forward and backward, said solenoid being mounted within said casing, said solenoid being connected to a rear half portion of said connector body through a speed reduction mechanism.

8. A connector according to claim 7, further comprising:
   a feed gear mounted within a feed gear receiving chamber provided at a rear half portion of said connector body, said feed gear being connected to said motor through said speed reduction mechanism, and said feed gear having threads formed on a peripheral surface thereof; and
   a cylindrical member connected to a rear portion of said connector body, said cylindrical member being threadedly engaged with said feed gear so as to move said connector body forward and backward when said motor is rotated in normal and reverse directions.

9. A connector according to claim 7, in which said connector body has a plurality of connectors connected to said cylindrical member, respectively, and said cylindrical member is connected to said feed gear, respectively.

10. A connector comprising:
    a tubular casing having a connector receiving chamber at its front half portion and a feed gear receiving chamber at its rear half portion, said casing also having an operation chamber at a side portion thereof;

a connector body slidably mounted within said connector receiving chamber of said casing, said connector body having a plurality of terminals received therein;

a motor fixedly mounted within said operation chamber;

a feed gear mounted within said feed gear receiving chamber, said feed gear being connected to said motor through a speed reduction mechanism, and said feed gear having threads formed on a peripheral surface thereof; and a cylindrical member connected to a rear portion of said connector body, said cylindrical member being threadedly engaged with said feed gear so as to move said connector body forward and backward when said motor is rotated in normal and reverse directions, wherein wire, connected respectively to said plurality of terminals within said connector body, are passed through a bore of said cylindrical member to the exterior of said connect, and wherein said cylindrical member is fitted on a metal shell, fixed to a rear end portion of said connector body, against rotation relative to said metal shell, and said wires, are gathered into a bundle by said metal shell.

* * * * *